US009924157B2

(12) United States Patent
Kimura

(10) Patent No.: US 9,924,157 B2
(45) Date of Patent: Mar. 20, 2018

(54) IMAGE PROCESSING DEVICE, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Naoto Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 15/086,453

(22) Filed: Mar. 31, 2016

(65) Prior Publication Data
US 2016/0301917 A1  Oct. 13, 2016

(30) Foreign Application Priority Data

Apr. 8, 2015 (JP) ................... 2015-078987
Feb. 22, 2016 (JP) ................... 2016-030973

(51) Int. Cl.
| H04N 13/02 | (2006.01) |
| H04N 13/00 | (2018.01) |
| G06T 5/00 | (2006.01) |
| G06T 5/50 | (2006.01) |

(52) U.S. Cl.
CPC ......... *H04N 13/0271* (2013.01); *G06T 5/005* (2013.01); *G06T 5/50* (2013.01); *H04N 13/0011* (2013.01); *G06T 2207/10028* (2013.01)

(58) Field of Classification Search
USPC ....................................................... 382/154
See application file for complete search history.

(56) References Cited

U.S. PATENT DOCUMENTS

| 8,928,736 B2 | 1/2015 | Nakajima et al. |
| 8,988,592 B2 | 3/2015 | Takahashi |
| 2005/0041737 A1* | 2/2005 | Matsumura ........ H04N 13/0011 375/240.01 |
| 2010/0134486 A1* | 6/2010 | Colleen ................... G06T 17/05 345/419 |
| 2013/0022111 A1* | 1/2013 | Chen ...................... H04N 19/50 375/240.12 |

(Continued)

FOREIGN PATENT DOCUMENTS

| JP | 2009-212728 A | 9/2009 |
| JP | 2012-221128 A | 11/2012 |
| JP | 2013-239119 A | 11/2013 |

*Primary Examiner* — Jerome Grant, II
(74) *Attorney, Agent, or Firm* — Fitzpatrick, Cella, Harper & Scinto

(57) ABSTRACT

In an image processing device, an image transformation unit performs coordinate conversion on image data acquired by an image acquisition unit to perform a transformation process. A depth MAP generation unit generates information on a depth MAP from the image data acquired by the image acquisition unit. When an image is generated at an arbitrary viewpoint from images photographed at a plurality of viewpoints, a depth MAP transformation unit performs coordinate conversion on the depth MAP and performs a viewpoint changing process on the depth MAP. An αMAP generation unit generates an αMAP which is combination information using the depth MAP after the viewpoint changing process. An image combination unit sequentially performs processes of combining a plurality of images based on the αMAP to generate image data at the arbitrary viewpoint.

21 Claims, 17 Drawing Sheets

(56) References Cited

U.S. PATENT DOCUMENTS

| | | | |
|---|---|---|---|
| 2013/0033490 A1* | 2/2013 | Zhang | G06T 15/20 345/419 |
| 2013/0278597 A1* | 10/2013 | Sasaki | G06T 15/00 345/419 |
| 2014/0232820 A1* | 8/2014 | Ha | H04N 13/026 348/43 |
| 2015/0109415 A1* | 4/2015 | Son | G01B 11/22 348/46 |
| 2015/0156404 A1 | 6/2015 | Takahashi | |
| 2015/0304665 A1* | 10/2015 | Hannuksela | H04N 19/70 375/240.02 |
| 2017/0127048 A1* | 5/2017 | Nobayashi | H04N 13/0271 |

* cited by examiner

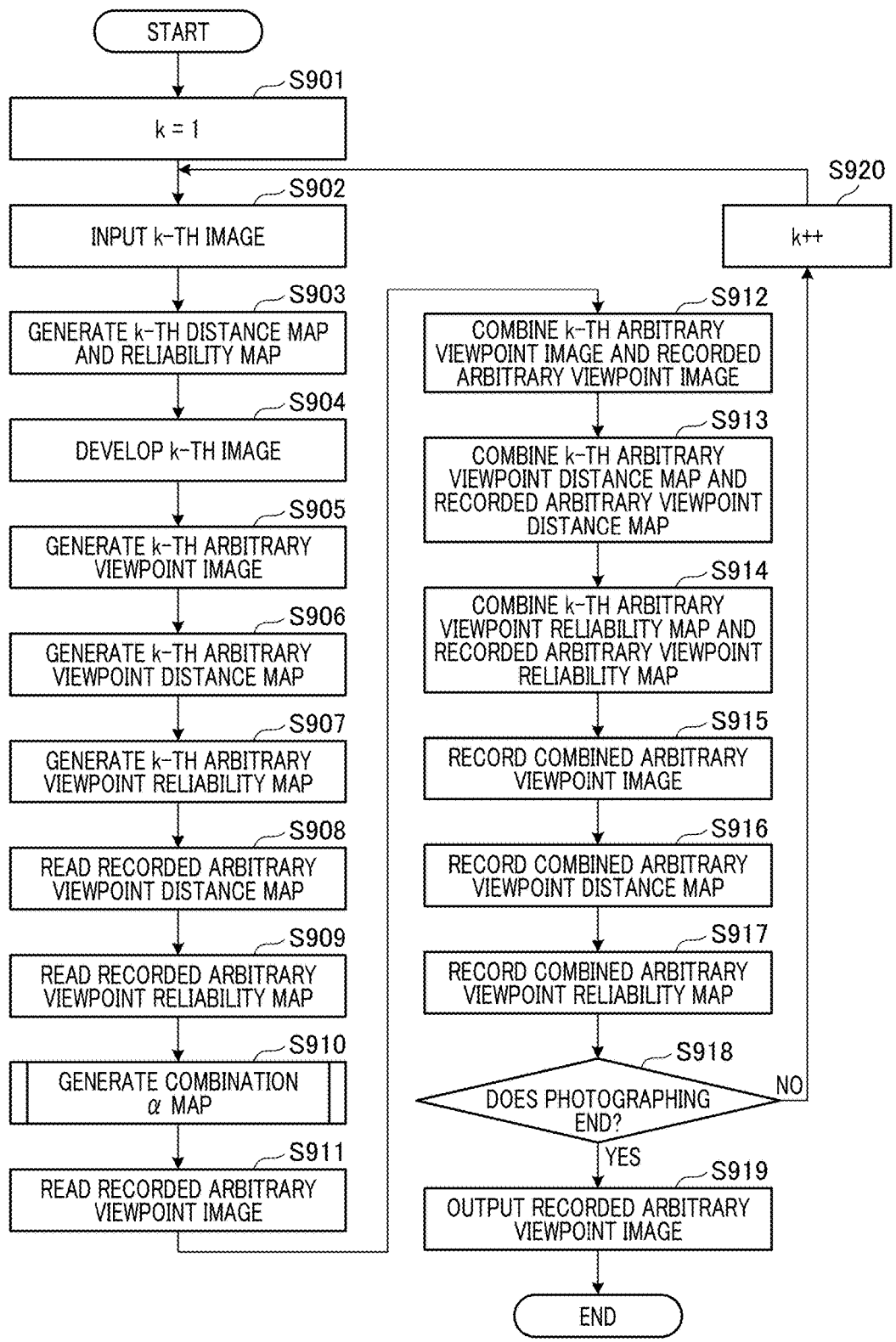

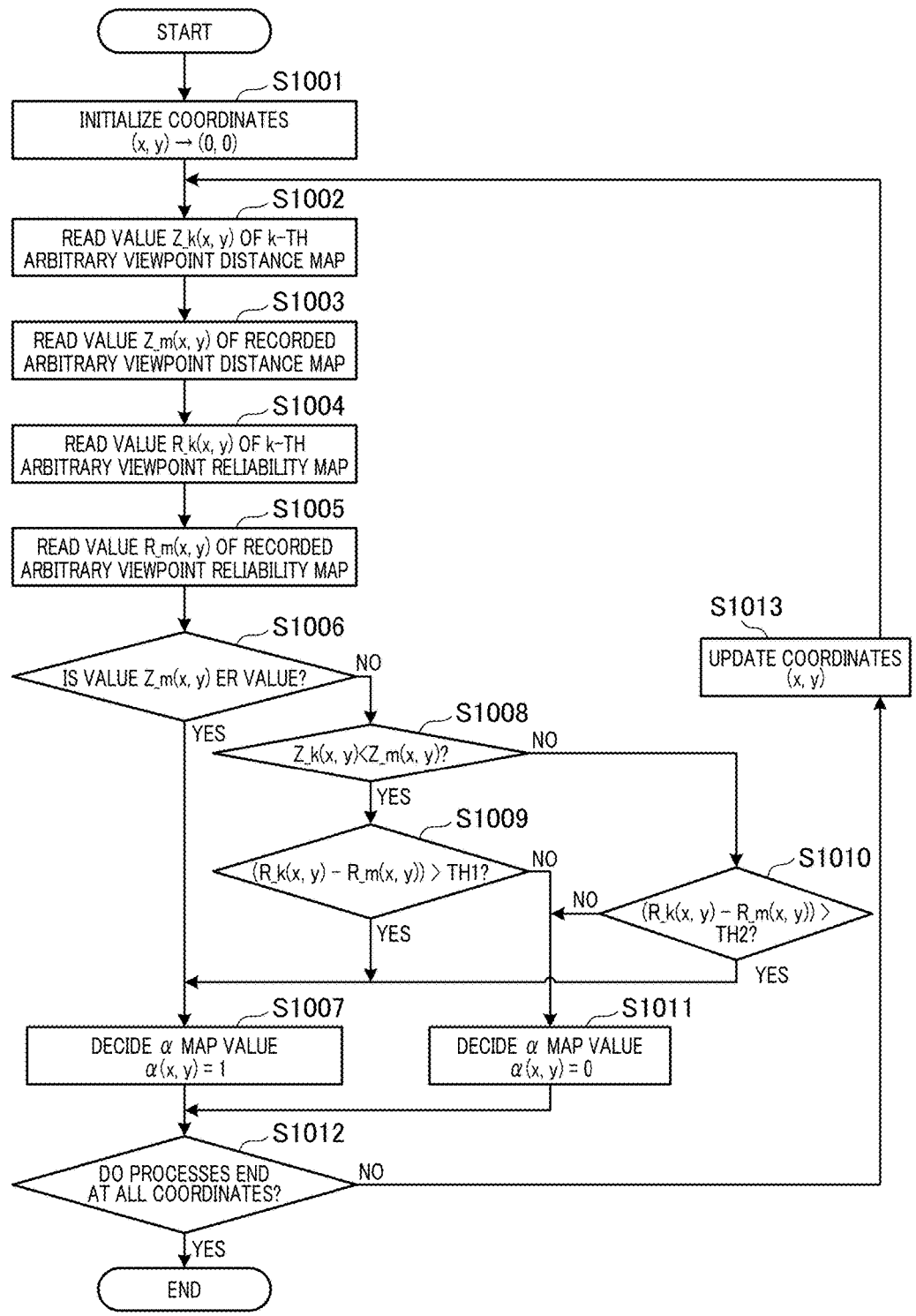

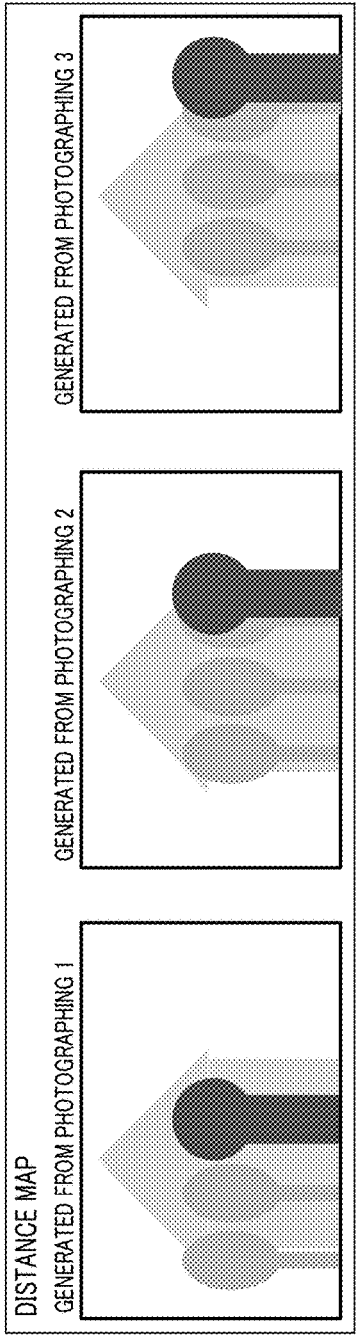
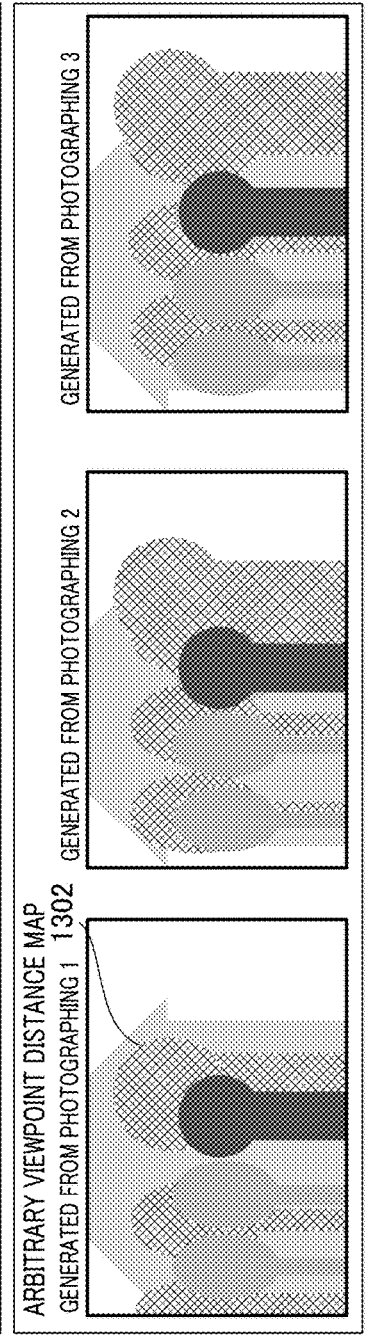
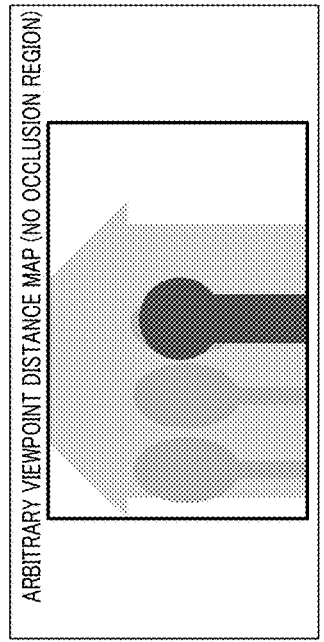
FIG. 13A
FIG. 13B
FIG. 13C

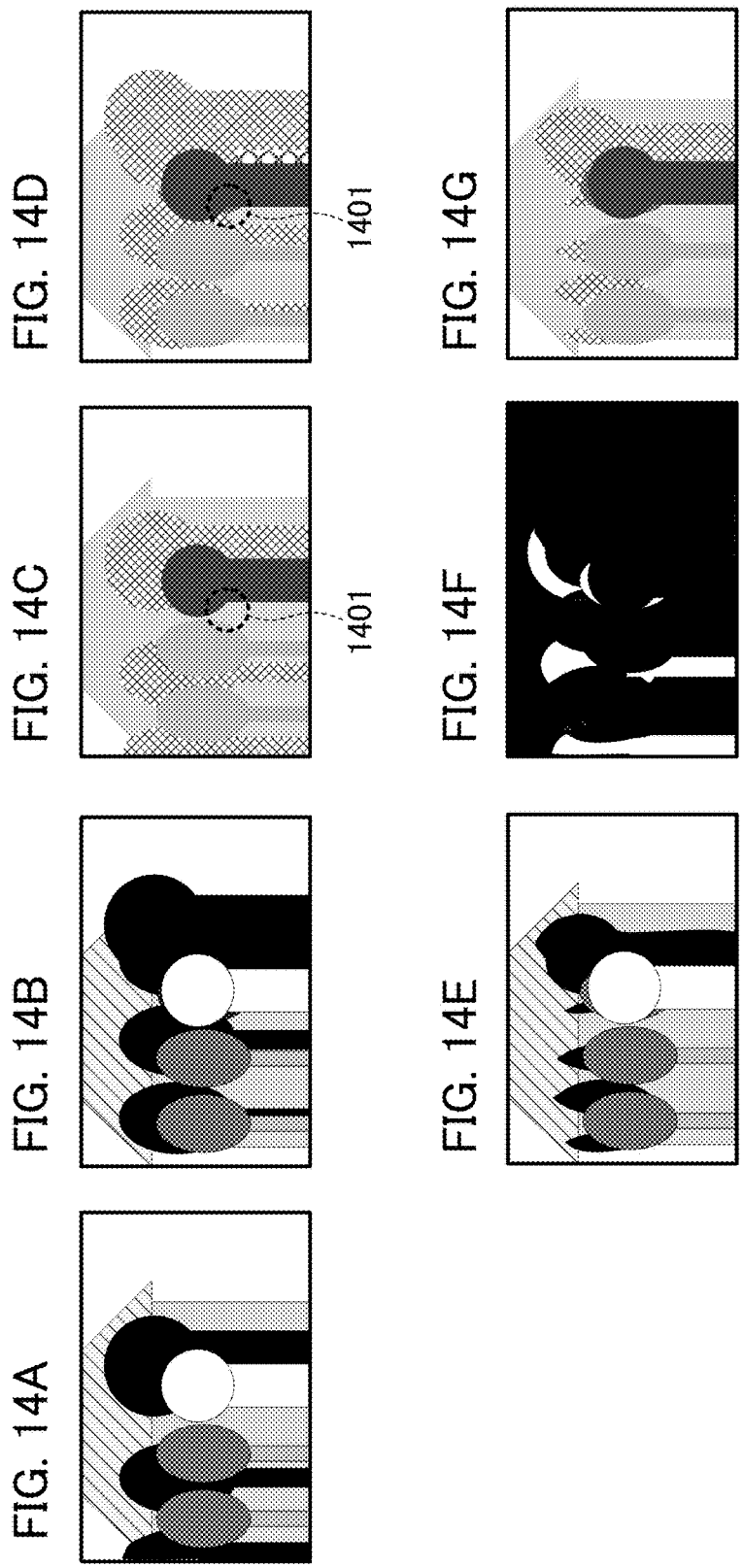

IMAGE PROCESSING DEVICE, IMAGE PICKUP APPARATUS, IMAGE PROCESSING METHOD, AND STORAGE MEDIUM

BACKGROUND OF THE INVENTION

Field of the Invention

The present invention relates to an image generation process performed at arbitrary viewpoint positions through a 3-dimensional reconstruction technology.

Description of the Related Art

In the related art, as 3-dimensional reconstruction technologies, there are technologies for reconstructing 3-dimensional data from images at a plurality of viewpoints at the time of photographing and subsequently generating images similar to images photographed at different viewpoints based on the 3-dimensional data. For example, viewpoints set after imaging (hereinafter referred to as arbitrary viewpoints) can be selected arbitrarily by users. In the technology disclosed in Japanese Patent Laid-Open No. 2009-212728, feature amounts between images chronologically close to target images are calculated when images are generated at arbitrary viewpoints from images at a plurality of viewpoints. When reliability of the feature amounts is low, 3-dimensional data with high accuracy can be generated by reconstructing 3-dimensional data based on chronologically previous and subsequent images.

There is a possibility of regions with no correlation between images at a plurality of viewpoints in an image generation process at arbitrary viewpoint positions being regions that are hidden due to changes in viewpoints (regions shielded by subjects), that is, occlusion regions. For this reason, when 3-dimensional data is reconstructed from chronologically previous and subsequent image information and change amounts of occlusion regions are small between images, there are limits improving mapping precision. Images are assumed to be generated at arbitrary viewpoints after a simultaneous process of mapping all of the images to 3-dimensional data at once is performed. In this case, the amount of data processed at once may be considerable.

SUMMARY OF THE INVENTION

The present invention provides an image processing device, an image pickup apparatus, an image processing method, and a storage medium capable of performing sequential processes of generating images at arbitrary viewpoint positions from a plurality of pieces of image data.

According to an aspect of the present invention, there is provided a device including: an image acquisition unit configured to acquire image data; a depth information acquisition unit configured to acquire depth information corresponding to depth distribution in a depth direction of the image data acquired by the image acquisition unit; an image transformation unit configured to perform an image transformation process on the image data acquired by the image acquisition unit through coordinate conversion; a depth information transformation unit configured to perform a transformation process on the depth information acquired by the depth information acquisition unit through coordinate conversion corresponding to the coordinate conversion performed on the image data; and an image combination unit configured to combine a plurality of images transformed by the image transformation unit based on the depth information transformed by the depth information transformation unit.

Further features of the present invention will become apparent from the following description of exemplary embodiments (with reference to the attached drawings).

BRIEF DESCRIPTION OF THE DRAWINGS

FIG. 8 is a flowchart illustrating the flow of image processing according to the second embodiment.

FIG. 9 is a flowchart illustrating a processing example performed by the αMAP generation unit 710 in FIG. 6.

FIGS. 13A to 13C are diagrams exemplifying arbitrary viewpoint distance MAPs and distance MAPs at photographing positions.

FIGS. 14A to 14G are diagrams for describing a combination process with photographing 1 and photographing 2.

DESCRIPTION OF THE EMBODIMENTS

Hereinafter, embodiments of the present invention will be described in detail with reference to the appended drawings. In the embodiments, a process of generating an image at a position of an arbitrary viewpoint (hereinafter referred to as an arbitrary viewpoint position) from an image photographed by changing a viewpoint position is performed. The process is performed whenever photographed images are sequentially input, and image data at arbitrary viewpoint positions is updated. In the following description, an image at an arbitrary viewpoint position is referred to as an "arbitrary viewpoint image." Positional relations will be described with the side from which a subject approaches an image pickup apparatus defined as a front side.

First Embodiment

Hereinafter, an image processing device according to a first embodiment of the present invention will be described.

First, an overview of image processing according to the embodiment will be described. To generate arbitrary viewpoint images, images photographed by changing viewpoint positions are subjected to an image transformation process and a transformation process for a distance MAP (depth distribution) performed to change viewpoints. A distance MAP is a subject photographing distance at each pixel position, that is, distance information indicating a distance distribution. Here, as the distance MAP, a relative relation of a distance (depth) between subjects in the image corresponding to the distance (depth) distribution may be determined. For example, the relative relation may be in the form of distribution information of an image deviation amount, which is obtained from paired parallax images, between the parallax images or distribution information such as a defocus amount obtained by converting the image deviation amount into a defocus amount. In the embodiment, it is characterized in that a transformation process of changing a viewpoint is performed even on the distance MAP. After the transformation process, a combination map (an αMAP to be described below) is generated based on the distance MAP in which the viewpoint is changed. Processes of updating data of the arbitrary viewpoint images are sequentially performed by combining a plurality of images after the viewpoint change using the combination map. Hereinafter, the embodiment will be described in sequence.

Figure 1:
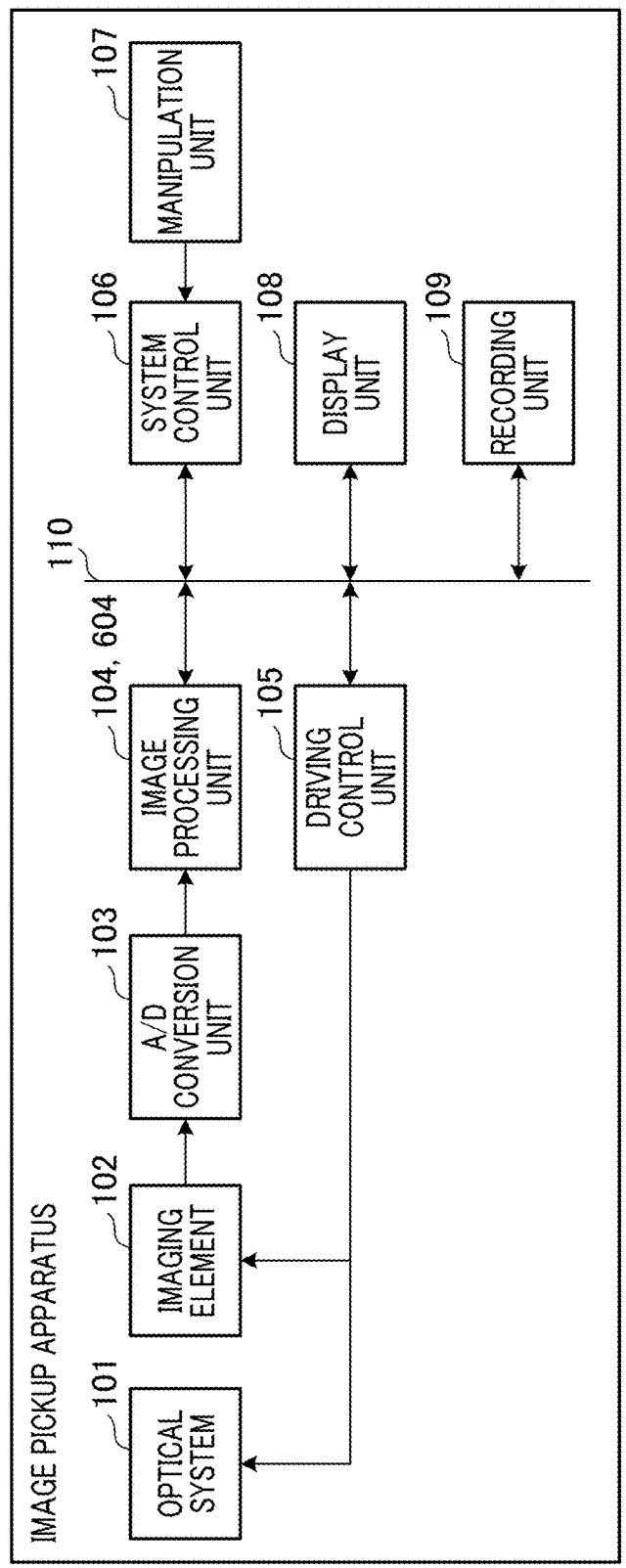
FIG. 1 is a block diagram illustrating an example of the configuration of an image pickup apparatus according to an embodiment of the present invention.

FIG. 1 is a block diagram illustrating an example of a configuration of an image pickup apparatus when the image processing device according to the embodiment is applied to the image pickup apparatus.

An optical system 101 includes a lens group formed of a zoom lens, a focus lens, and the like, a diaphragm adjustment device, and a shutter device. The optical system 101 adjusts a magnification of a subject image formed on a light reception surface of an imaging element 102, a focus position, or a light amount. The imaging element 102 converts a light flux coming from a subject and passing through the optical system 101 into an electric signal through photoelectric conversion. The imaging element 102 is a photoelectric conversion element such as an image sensor using a charge-coupled device (CCD) or a complementary metal-oxide semiconductor (CMOS). In the embodiment, the pixels of the imaging element 102 have a Bayer array with RGB color filters. The pixels each serve as a pupil-splitting type sensor in which at least two photoelectric conversion elements correspond to one micro lens. However, the form of the imaging element is not limited thereto. An analog/digital (A/D) conversion unit 103 acquires an output signal of the imaging element 102 and converts a video signal into a digital image signal.

An image processing unit 104 performs not only known signal processing on outputs from the A/D conversion unit 103 but also a process of generating an arbitrary viewpoint image from a plurality of input images. The processes performed by the image processing unit 104 will be described in detail below. The image processing unit 104 performs the image processing not only on image data output from the A/D conversion unit 103 but also on image data read from a recording unit 109. A driving control unit 105 performs driving control on the optical system 101 and the imaging element 102 to perform adjustment of a diaphragm value, sensitivity, a focal distance, and a focal position or camera-shake correction (image blur correction).

A system control unit 106 includes a central processing unit (CPU) and is a general control unit that performs general control of operations of the entire image pickup apparatus. The system control unit 106 outputs a driving control signal to the driving control unit 105 based on a luminance value obtained from an image processed by the image processing unit 104 or an instruction signal transmitted from a manipulation unit 107, and controls the optical system 101 or the imaging element 102.

A display unit 108 includes a liquid crystal display or an organic electroluminescence (EL) display. The display unit 108 displays an image according to image data acquired by the imaging element 102 or image data read from the recording unit 109. The recording unit 109 has a function of recording the image data and includes an information recording medium. For example, a memory card on which a semiconductor memory is mounted or an information recording medium using a package or the like that accommodates a rotary recording mechanism such as a magneto-optical disc can be used. The information recording medium can be detachably mounted on the image pickup apparatus.

A bus 110 is used to access the image processing unit 104, the driving control unit 105, the system control unit 106, the display unit 108, and the recording unit 109 and transmit and receive image data or signals to and from these units.

Figure 2:
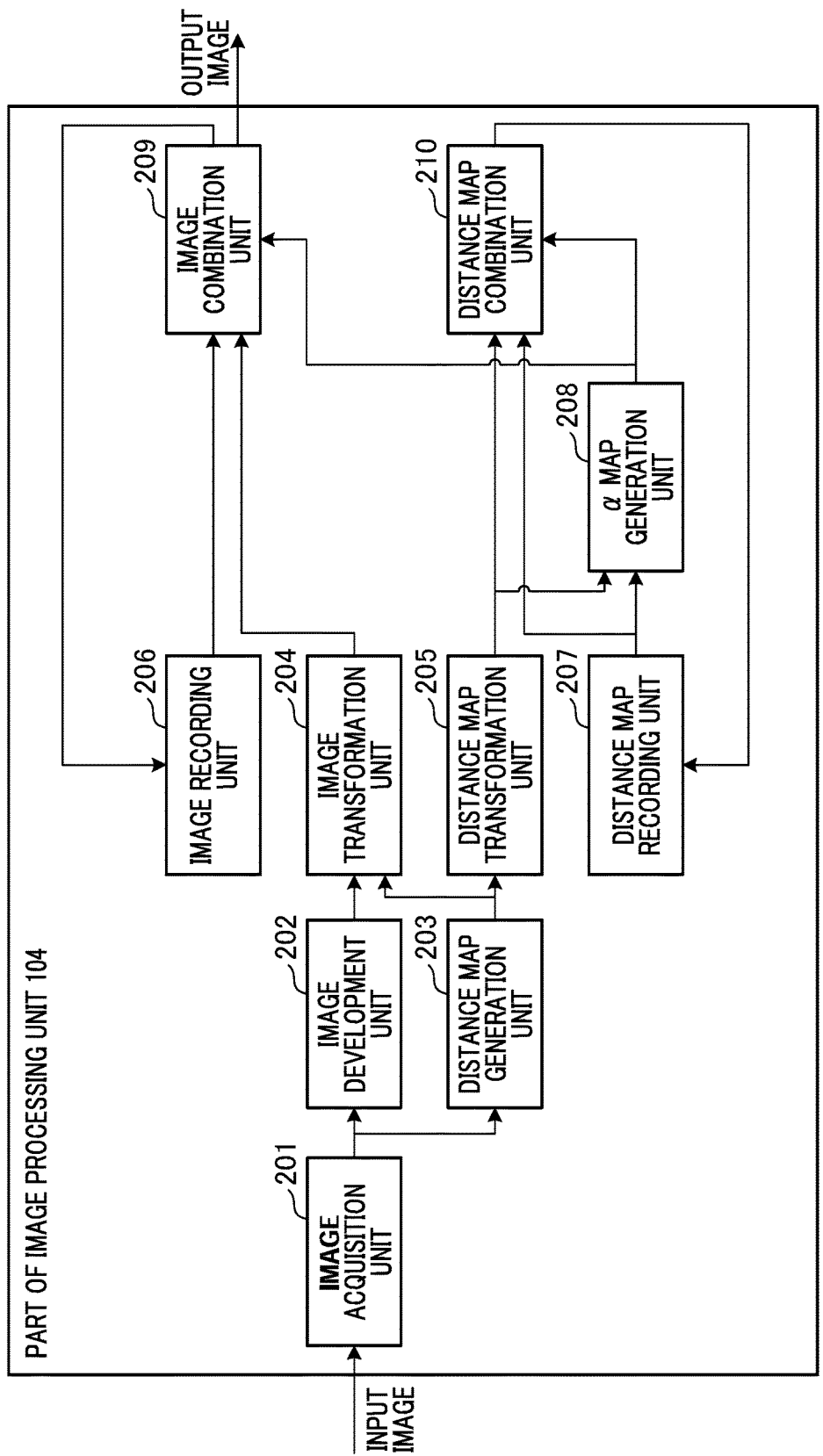
FIG. 2 is a block diagram illustrating an example of the configuration of an image processing unit 104 according to a first embodiment.

Next, a configuration according to the embodiment in the image processing unit 104 will be described in detail with reference to FIG. 2. FIG. 2 is a block diagram illustrating a part of the image processing unit 104.

An image acquisition unit 201 sequentially acquires image data output from the A/D conversion unit 103 and outputs the image data to an image development unit 202 and a distance MAP generation unit 203. The image development unit 202 outputs the image data subjected to a development process to an image transformation unit 204. An image recording unit 206 records data of arbitrary viewpoint images. An image combination unit 209 acquires the image data from the image transformation unit 204 and the image recording unit 206 and outputs image data after the image combination.

The distance MAP generation unit 203 generates data of a distance map (also referred to as a distance MAP) as distance information of a depth direction regarding the image data and outputs the data to a distance MAP transformation unit 205. In the distance MAP generation process, distance information regarding paired image data corresponding to different pupil regions of an imaging optical system acquired from the imaging element 102 is generated in accordance with a known method using correlation calculation. However, the present invention is not limited thereto. The distance information may be generated in accordance with a method of acquiring distance information from a pair of pieces of image data that have parallax and are obtained from a plurality of imaging units or a DFD method using correlation calculation such as SAD from image data of which focus positions are different (see Japanese Patent Laid-Open No. 2013-239119). SAD is an abbreviation for "Sum of Absolute Difference" and DFD is an abbreviation for "Depth from Defocus." The distance MAP transformation unit 205 generates information on the distance MAP at arbitrary viewpoint positions and outputs the information to a distance MAP combination unit 210. A distance MAP recording unit 207 records the information transformed and processed by the distance MAP transformation unit 205. The information read from the distance MAP recording unit 207 is output to an αMAP generation unit 208 and the distance MAP combination unit 210. The αMAP generation unit 208 generates combination αmap information (also referred to as an αMAP) to be described below and outputs the αmap information to the image combination unit 209 and the distance MAP combination unit 210.

Figure 4:
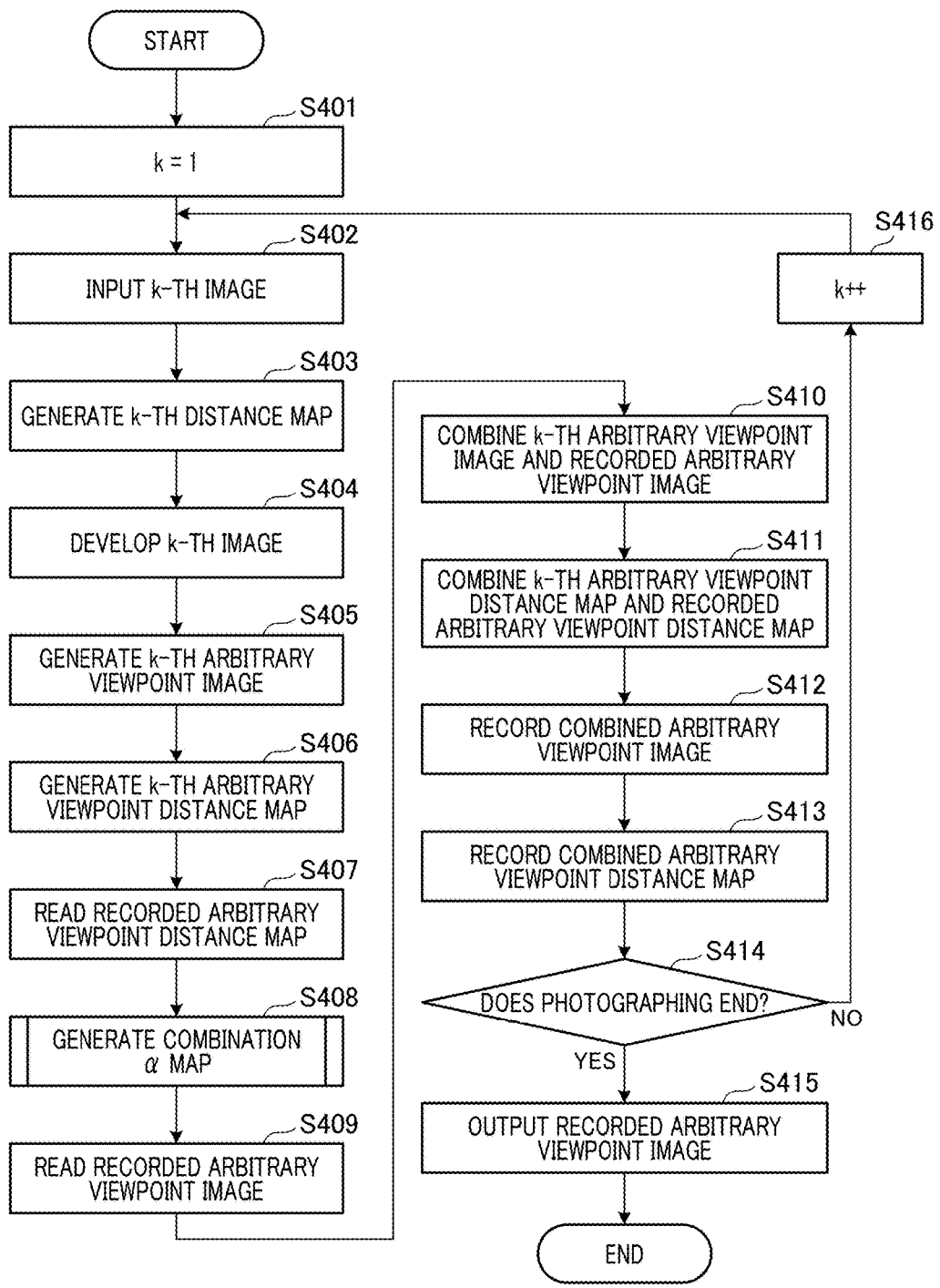
FIG. 4 is a flowchart illustrating the flow of image processing according to the first embodiment.

An operation of the image processing unit 104 illustrated in FIG. 2 will be described with reference to the flowchart of FIG. 4. The following process is performed according to a control instruction by the system control unit 106.

When a photographing operation starts, the image processing unit 104 initializes a value of a variable (written as k) used for sequential processes to 1 in S401. In S402, the image acquisition unit 201 performs a process of inputting data of a k-th photographed image. In S403, the distance MAP generation unit 203 generates a k-th distance MAP corresponding to the k-th photographed image input in S402. In the embodiment, as described above, the distance MAP is generated using paired parallax image data corresponding to a k-th photographed image obtained from the imaging element 102. At this time, the distance MAP is generated using the parallax image data in a color signal or luminance signal state of RGB subjected to a correction process of correcting, for example, signal attenuation or noise caused in the imaging element 102 or a following processing circuit. In S404, the image development unit 202 performs a development process on the k-th image data input in S402 and converts the data into image data with good visibility in conformity with an image output device. The development process is a process including at least a part of a shading correction process, an imaging signal correction process, a white balance adjustment process, a noise reduction process, an edge enhancement process, a color matrix process, and a gamma correction process. The k-th image handled in processes subsequent to S405 refers to an image subjected to the development process in S404.

In S405, the image transformation unit 204 performs a process of transforming the k-th image developed in S404 using the information on the k-th distance MAP generated in S403. Through the image transformation process, the data of the k-th arbitrary viewpoint image is generated. The details of the process of generating the arbitrary viewpoint image will be described below. In S406, the distance MAP transformation unit 205 generates information on the distance MAP at the k-th arbitrary viewpoint position using the information on the k-th distance MAP generated in S403 as an input. The distance MAP at the arbitrary viewpoint position is referred to as an "arbitrary viewpoint distance MAP" below. A process of generating the arbitrary viewpoint distance MAP will be described in detail below.

In S407, the αMAP generation unit 208 reads the information on the first to "k−1"-th arbitrary viewpoint distance MAPS that are processed and recorded on the distance MAP recording unit 207. In S408, the αMAP generation unit 208 generates information on the combination αmap using the information on the k-th arbitrary viewpoint distance MAP and the information on the arbitrary viewpoint distance MAP recorded on the distance MAP recording unit 207 as inputs. The information on the αMAP generated in S408 is used in S410 and S411 to be described below. A process of generating the combination αMAP will be described in detail below.

In S409, the image combination unit 209 reads the data of the first to "k−1"-th arbitrary viewpoint images that are processed and recorded on the image recording unit 206. In S410, the image combination unit 209 acquires the data of the k-th arbitrary viewpoint image from the image transformation unit 204 and acquires the data of the arbitrary viewpoint image recorded on the image recording unit 206. The image combination unit 209 combines the pieces of acquired image data based on the information on the αMAP generated in S408. Here, in a 2-dimensional coordinate system set in the image, an αMAP value at coordinates (x, y) of a certain point is written as α(x, y). A pixel value of the k-th arbitrary viewpoint image is written as pix_k(x, y) and a pixel value of the arbitrary viewpoint image recorded on the image recording unit 206 is written as pix_m(x, y). When a pixel value of the arbitrary viewpoint image after the combination is written as pix(x, y), pix(x, y) is calculated as in Math. 1.

$$\text{pix}(x,y) = \alpha(x,y) \cdot \text{pix\_k}(x,y) + (1-\alpha(x,y)) \cdot \text{pix\_m}(x,y) \quad \text{[Math. 1]}$$

In the embodiment, the value of α(x, y) is assumed to be binary (0 or 1), but a multivalued logic taking values equal to or greater than 0 and equal to or less than 1 may be used as necessary. The same also applies to calculation of the following distance MAP combination.

In S411, the distance MAP combination unit 210 which is a distance information combination unit acquires the information on the k-th arbitrary viewpoint distance MAP from the distance MAP transformation unit 205 and acquires the information on the arbitrary viewpoint distance MAP recorded on the distance MAP recording unit 207. The distance MAP combination unit 210 performs the distance information combination process on the arbitrary viewpoint distance MAP based on the information on the αMAP generated in S408. In the 2-dimensional coordinate system set in the image, at certain coordinates (x, y), a value of the k-th arbitrary viewpoint distance MAP is written as Z_k(x, y) and a value of the arbitrary viewpoint distance MAP recorded on the distance MAP recording unit 207 is written as Z_m(x, y). When a value of the distance MAP after the combination is written as Z(x, y), Z(x, y) is calculated as in Math. 2 using α(x, y) which is the αMAP value.

$$Z(x,y) = \alpha \cdot Z\_k(x,y) + (1-\alpha) \cdot Z\_m(x,y) \quad \text{[Math. 2]}$$

In S412, the image combination unit 209 outputs the data of the arbitrary viewpoint image combined in S410 to the image recording unit 206 and updates the data of the arbitrary viewpoint image. In S413, the distance MAP combination unit 210 outputs the arbitrary viewpoint distance MAP combined in S411 to the distance MAP recording unit 207 and updates the recorded arbitrary viewpoint distance MAP. S414 is a process of determining whether the photographing performed by the image pickup apparatus ends. That is, the image processing unit 104 determines whether a subsequent "k+1"-th image is input. When the photographing performed by the image pickup apparatus ends and the "k+1"-th image data is not input, the process moves to S415. When the photographing performed by the image pickup apparatus does not end and the "k+1"-th image data is input, the process proceeds to S416.

In S415, the image processing unit 104 outputs the data of the arbitrary viewpoint images generated from the data of k images processed up to the current time point as output image data and ends a series of processes. Any arbitrary viewpoint image data output from the image processing unit 104 is encoded and recorded on the same image file, including the corresponding distance MAP. Alternatively, the output arbitrary viewpoint image data is associated with the corresponding distance MAP and is recorded in a separate file. On the other hand, in S416, the "k+1"-th image data is input and a process of increasing the variable k value (k++) is performed. That is, after the variable k is updated as k+1, the process returns to S402.

In the embodiment, the example in which the k-th image data is processed and the data of the arbitrary viewpoint image generated until the end of the photographing is not output has been described. The present invention is not limited to this example, but the data of the sequentially generated arbitrary viewpoint images may be output as the output image data of the image processing unit 104. The same also applies to embodiments to be described below.

Figure 10A:
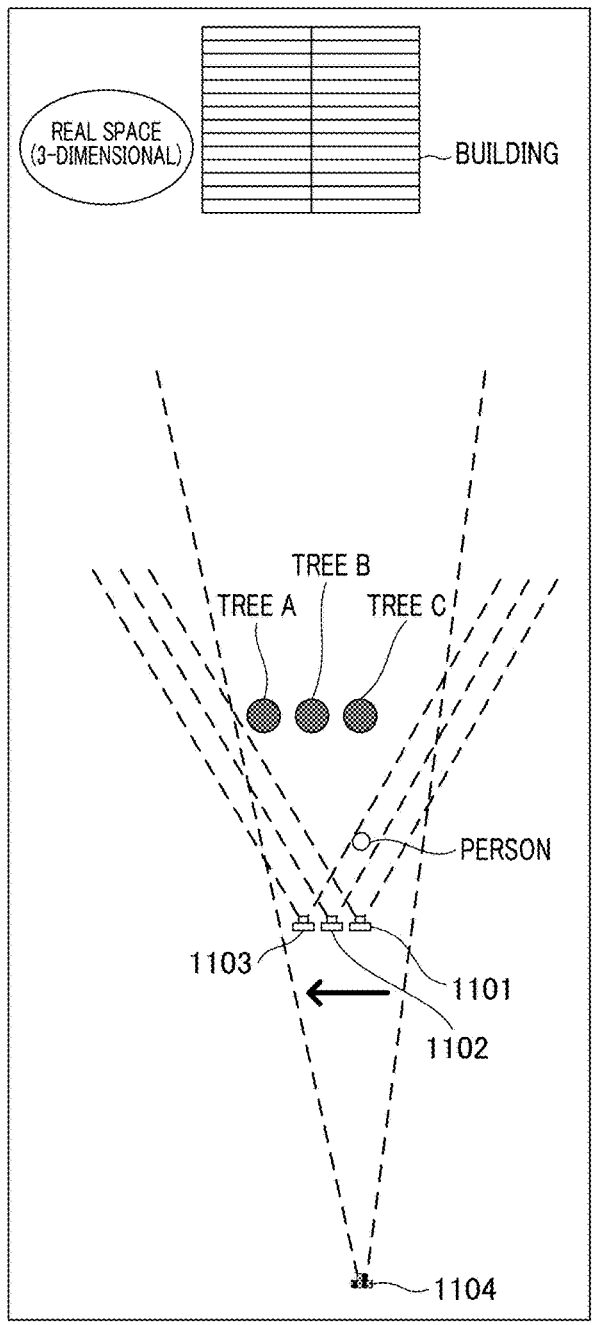
FIGS. 10A to 10C are diagrams for describing a relation between photographed images and arbitrary viewpoint images.
Figure 10B:
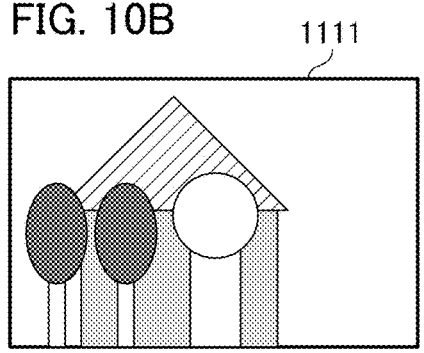
Figure 10C:
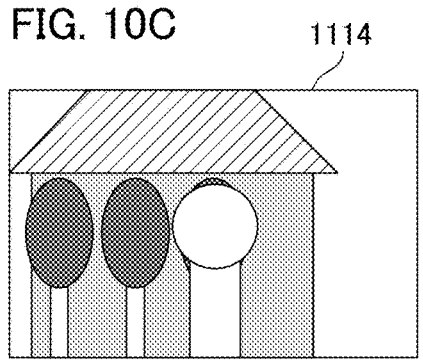

Next, the process of generating the arbitrary viewpoint image, as described in S405 of FIG. 4, will be described in detail. FIGS. 10A to 10C exemplify a relation between a photographed image and an arbitrary viewpoint image. As illustrated in FIG. 10A, a scene in which a person, trees A to C behind the person, and a building further behind the person are subjects is assumed in relation to photographing positions 1101 to 1103. An arbitrary viewpoint position is indicated by a position 1104. FIG. 10B illustrates a photographed image 1111 photographed with the building, the trees, and the person set as the subjects at the photographing position 1101. FIG. 10C illustrates an arbitrary viewpoint image 1114 at an arbitrary viewpoint position 1104.

When the photographing position corresponding to the photographed image 1111 illustrated in FIG. 10B is shown in the real space, the photographing position is the photographing position 1101 in FIG. 10A. A case in which an image that looks like an image photographed at the arbitrary viewpoint position 1104 based on the image photographed at the photographing position 1101 is generated as an arbitrary viewpoint image 1114 is assumed. In this case, information on the image photographed at the photographing position 1101 is not sufficient as subject information necessary to generate the arbitrary viewpoint image. That is, it is necessary to generate the arbitrary viewpoint image using information on images photographed at a plurality of positions including not only the photographing position 1101 but also the photographing positions 1102 and 1103 as an input. Hereinafter, photographing at the photographing position 1101 is referred to as "photographing 1," photographing at the photographing position 1102 is referred to as "photographing 2," and photographing at the photographing position 1103 is referred to as "photographing 3." In the embodiment, a processing example in which an arbitrary viewpoint image is generated based on three images will be described.

Figure 11A:
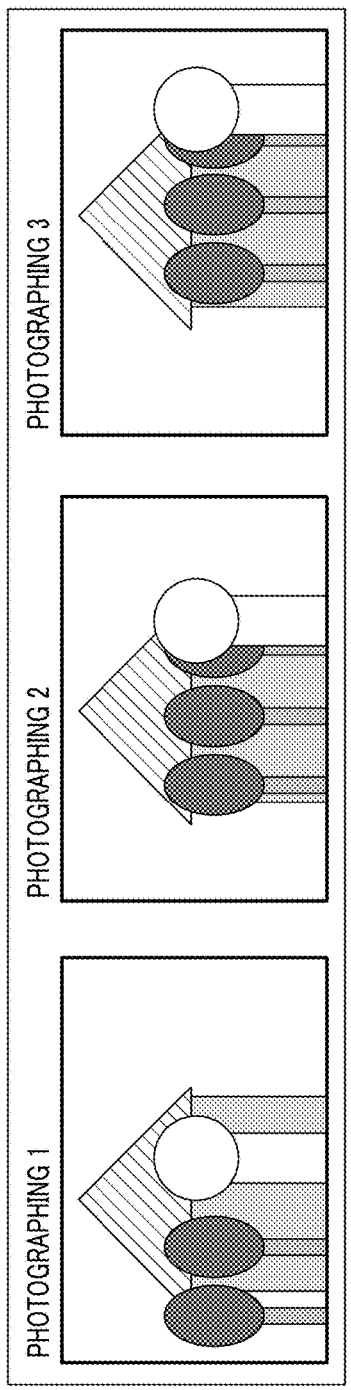
FIGS. 11A to 11C are diagrams for describing a distance MAP and photographed images at photographing positions.
Figure 11B:
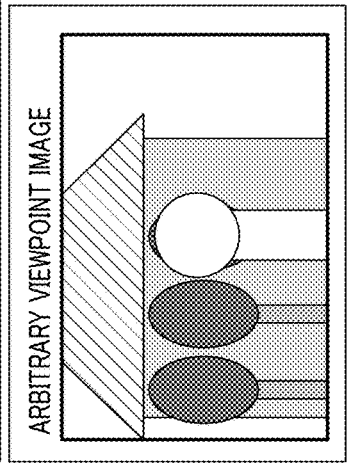
Figure 11C:
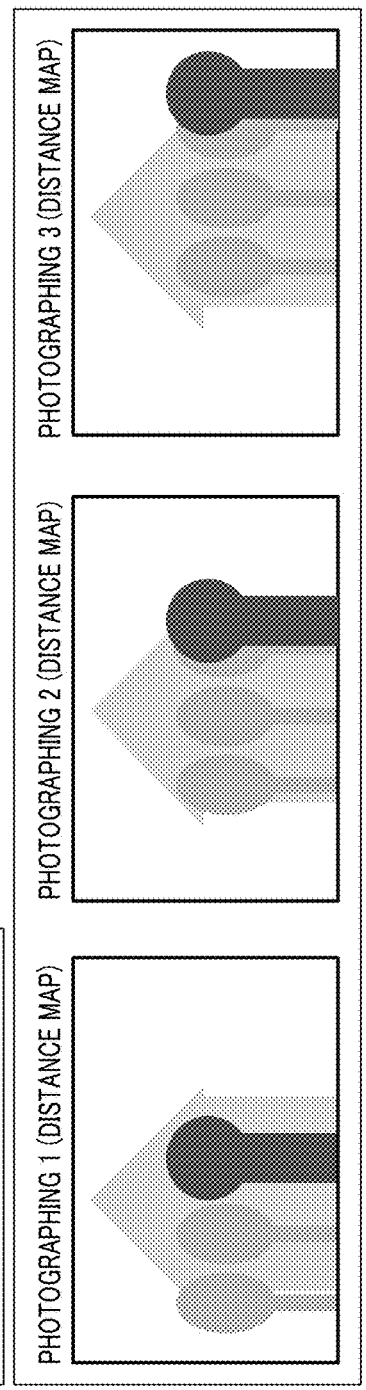

A process of generating the arbitrary viewpoint image from photographed images will be described with reference to FIGS. 11A to 11C. FIG. 11A is a diagram illustrating photographed images obtained at photographing positions of photographing 1 to photographing 3. FIG. 11B is a diagram illustrating an arbitrary viewpoint image. It is necessary to perform image transformation as if the images photographed at the photographing positions of photographing 1, photographing 2, and photographing 3 corresponded to the position of the arbitrary viewpoint image. In order to transform the photographed images to an image at the arbitrary viewpoint position, distance MAPs of photographing 1 to photographing 3 illustrated in FIG. 11C are necessary. That is, the distance MAPs indicating photographing distances of the subjects formed as images at pixels of the photographed images are necessary in photographing 1 to photographing 3.

In the process of transforming the images to the image at the arbitrary viewpoint position, a process of converting coordinates (x, y) of the photographed images into real-space coordinates (X, Y, Z) is first performed based on the plurality of photographed images. The coordinates (x, y) indicate 2-dimensional orthogonal coordinates and the real-space coordinates (X, Y, Z) indicate 3-dimensional orthogonal coordinates. When the position coordinates of the photographed image are written as (x, y) and a distance value of the distance MAP corresponding to the position coordinates (x, y) is written as Z, the real-space coordinates (X, Y, Z) is expressed in Math. 3 below. Here, "pp" indicates a pixel pitch of the photographed image and "f" indicates a focal distance at the time of photographing. The position coordinates (x, y) are coordinates indicated using an image center as the origin (0, 0).

$$\begin{pmatrix} X \\ Y \\ Z \end{pmatrix} = \begin{pmatrix} x \cdot pp \cdot \dfrac{Z}{f} \\ y \cdot pp \cdot \dfrac{Z}{f} \\ Z \end{pmatrix} \quad \text{[Math. 3]}$$

Figure 16A:
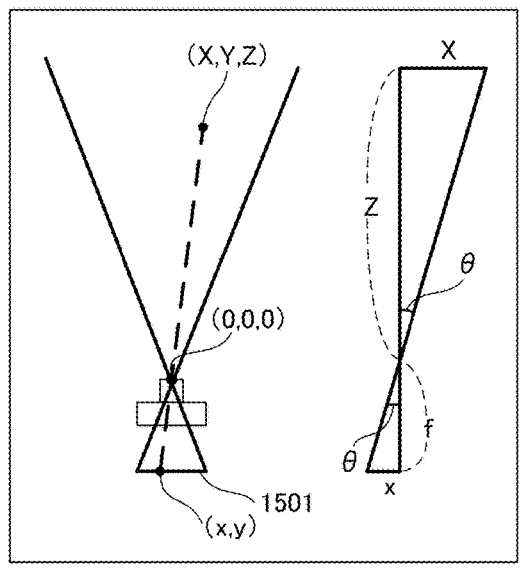
FIGS. 16A to 16C are schematic diagrams for describing a relation between 2-dimensional coordinates in an image and 3-dimensional coordinates in the real space.
Figure 16B:
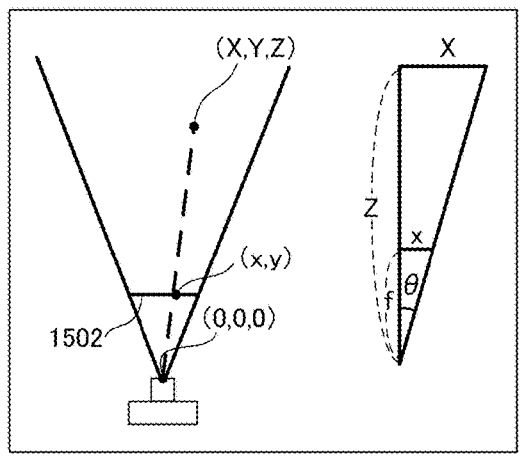
Figure 16C:
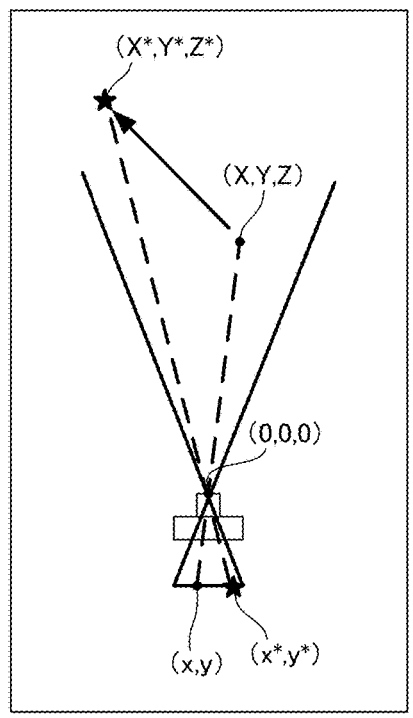

A calculation process for Math. 3 will be described with reference to FIGS. 16A to 16C. FIG. 16A is a diagram illustrating a correspondence relation between coordinates (x, y) on a photographed image and coordinates (X, Y, Z) on the real space. A projected plane 1501 which is a photographed image is indicated by a line segment. Math. 3 is calculated based on a homologous relation of triangles illustrated in FIG. 16A. The homologous relation of triangles can be expressed as in Math. 4 below using the same variables as Math. 3.

$$\tan\theta = \frac{x \cdot pp}{f} = \frac{X}{Z} \quad \text{[Math. 4]}$$

θ indicates a vertical angle between homologous triangles having the same vertex. In FIG. 16A, the projected plane 1501 which is a photographed image is illustrated on the side of a camera. However, FIG. 16B illustrates a case in which a projected plane 1502 which is a photographed image is on the side of the real space (in front of a camera). Even in this case, the concept is the same as above. Hereinafter, a coordinate conversion process in accordance with Math. 3 above is referred to as a "back projection conversion process". However, back projection conversion processes applicable to the embodiment are not limited to the foregoing.

Next, a process of converting the real-space coordinates (X, Y, Z) into real-space coordinates (X*, Y*, Z*) from an arbitrary viewpoint position is performed. Specifically, the coordinate conversion is performed in addition to rotation components about x, y, and z axes from a photographing position to an arbitrary viewpoint position and shift components in the x, y, and z directions. Matrix elements by the rotation components about the x, y, and z axes are written as $r_{11}$ to $r_{33}$. The shift components in the x, y, and z directions before rotation are written as $t_1$ to $t_3$ and the shift components in the x, y, and z directions after rotation are written as $t^*_1$ to $t^*_3$. In the process of converting the real-space coordinates (X, Y, Z) into the real-space coordinates (X*, Y*, Z*) from an arbitrary viewpoint position, calculation expressed in Math. 5 below is performed.

$$\begin{pmatrix} X^* \\ Y^* \\ Z^* \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} X + t_1 \\ Y + t_2 \\ Z + t_3 \end{pmatrix} + \begin{pmatrix} t^*_1 \\ t^*_2 \\ t^*_3 \end{pmatrix} \quad \text{[Math. 5]}$$

Hereinafter, the coordinate conversion process in accordance with Math. 5 is referred to as a "real-space movement conversion process." However, real-space movement conversion processes applicable to the embodiment are not limited to this. In the embodiment, a process of calculating the rotation components and the shift components from a photographed image to an image at an arbitrary viewpoint position is performed using a known technology such as posture estimation at the time of photographing using correspondence point searching between images. A photographing position is calculated through this process and a movement amount from the photographing position to the arbitrary viewpoint position is calculated (see Japanese Patent Laid-Open No. 2012-221128).

Finally, a process of converting the real-space coordinates (X*, Y*, Z*) into coordinates (x*, y*) on the arbitrary viewpoint image is performed. This conversion is performed using Math. 6 below. Here, the coordinates (x*, y*) are 2-dimensional coordinates indicated using an image center as the origin position (0, 0). Here, "pp*" indicates a pixel pitch of the arbitrary viewpoint image and "f*" indicates a focal distance of the arbitrary viewpoint image.

$$\begin{pmatrix} x^* \\ y^* \end{pmatrix} = \begin{pmatrix} \frac{X^*}{Z^*} \cdot \frac{f^*}{pp^*} \\ \frac{Y^*}{Z^*} \cdot \frac{f^*}{pp^*} \end{pmatrix}$$ [Math. 6]

Hereinafter, the coordinate conversion process in accordance with Math. 6 is referred to as a "projection conversion process." However, projection conversion processes applicable to the embodiment are not limited to this. The process of converting the photographed image into the image at the arbitrary viewpoint position, as indicated by the calculation from Math. 3 to Math. 6, is illustrated in FIG. 16C.

As described above, the coordinates (x, y) of the photographed image are converted into the real-space coordinates (X, Y, Z) through the back projection conversion process of Math. 3. Thereafter, the real-space coordinates (X, Y, Z) are converted into the real-space coordinates (X*, Y*, Z*) at the arbitrary viewpoint position through the real-space movement conversion process of Math. 5. Finally, the process of converting the real-space coordinates (X*, Y*, Z*) into the coordinates (x*, y*) of the arbitrary viewpoint image is performed through the projection conversion process of Math. 6. In this way, the process of transforming the photographed image into the image at the arbitrary viewpoint position ends. In the process of generating the pixel values of the photographed image into the pixel values of the arbitrary viewpoint image, general bilinear interpolation or bicubic interpolation is used. The process of generating the arbitrary viewpoint image in S405 of FIG. 4 has been described above.

Figure 12A:
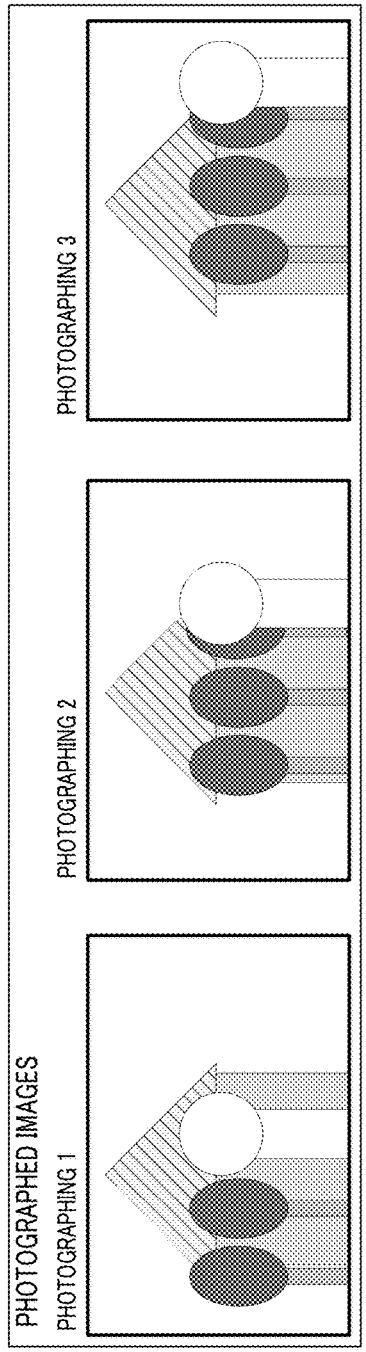
FIGS. 12A to 12C are diagrams exemplifying arbitrary viewpoint images and photographed images at photographing positions.

Next, the process of generating the arbitrary viewpoint distance MAP in S406 of FIG. 4 will be described in detail. A relation between the arbitrary viewpoint image and the arbitrary viewpoint distance MAP will be described with reference to FIGS. 12A to 12C and FIGS. 13A to 13C. FIG. 12A illustrates photographed images from photographing 1 to photographing 3, as in FIG. 11A. First, the distance MAP corresponding to each position of the photographed image is generated, as illustrated in FIG. 13A. FIG. 13A illustrates the distance MAPs of photographing 1 to photographing 3.

Figure 12B:
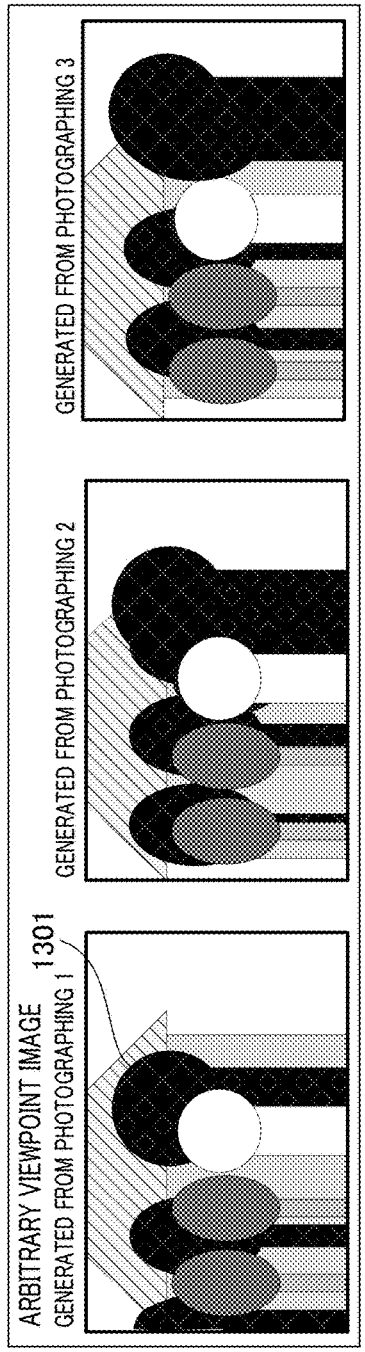

FIG. 12B illustrates photographed images illustrated in FIG. 12A and arbitrary viewpoint images generated from the distance MAPs illustrated in FIG. 13A. A region 1301 indicated in black indicates a region of an arbitrary viewpoint in which information has not been obtained from the photographed image. This region is referred to as an "occlusion region."

Figure 12C:
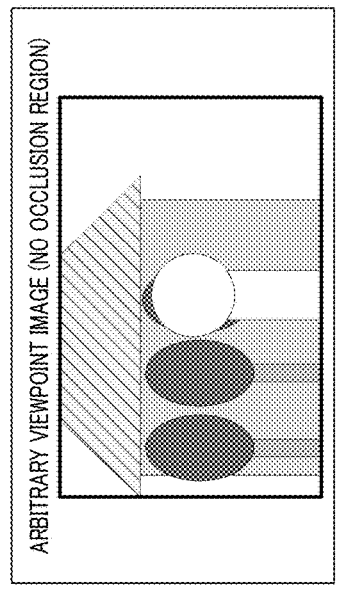

FIG. 12C exemplifies an arbitrary viewpoint image in which there is no occlusion region. In order to obtain such an arbitrary viewpoint image, it is necessary to combine the plurality of arbitrary viewpoint images generated from the photographed images and generate an image. At this time, as illustrated in FIG. 13B, the distance MAP corresponding to each arbitrary viewpoint image, that is, the arbitrary viewpoint distance MAP is necessary. In FIG. 13B, a region 1302 indicated in cross-hatching is an occlusion region. FIG. 13C illustrates the arbitrary viewpoint distance MAP in which there is no occlusion region. In order to obtain such an arbitrary viewpoint distance MAP, it is necessary to combine the arbitrary viewpoint distance MAPs generated from the photographed images and generate a distance MAP, as in the case of the arbitrary viewpoint images. Even in the combination of the arbitrary viewpoint distance MAPs, the recorded arbitrary viewpoint distance MAPs are necessary.

Here, a process of generating the arbitrary viewpoint distance MAP using the distance MAP generated from the photographed image will be described.

The coordinates of a distance MAP are assumed to be (x, y) and the coordinates of the arbitrary viewpoint distance MAP are assumed to be (x*, y*). A coordinate conversion process is performed by the same methods as in Math. 3, Math. 5, and Math. 6 described above in the method of generating the arbitrary viewpoint image. Accordingly, the detailed description will be omitted. A difference from the case of the arbitrary viewpoint image is that a process of converting the value of an arbitrary viewpoint distance MAP into the value of Z* in Math. 5 above is performed. The reason for performing this process is that it is necessary to convert the arbitrary viewpoint distance into a photographing distance from the arbitrary viewpoint position as the arbitrary viewpoint distance MAP.

Next, the process of generating a combination αMAP, as described in S408 of FIG. 4, will be described in detail.

The reason for combining the arbitrary viewpoint images generated from the photographed images and the arbitrary viewpoint distance MAPs is to generate the arbitrary viewpoint image and the arbitrary viewpoint distance MAP in which there is no occlusion region, as described above. The flow of the entire combination process will be described with reference to FIGS. 14A to 14G.

FIGS. 14A to 14G are diagrams illustrating the flow of the process of generating the arbitrary viewpoint image and the arbitrary viewpoint distance MAP in which there is no occlusion region by sequentially performing combination processes. FIGS. 14A to 14G illustrate a combination process for the arbitrary viewpoint images and the arbitrary viewpoint distances MAP of photographing 1 and photographing 2. FIGS. 15A to 15G illustrate a combination process for the arbitrary viewpoint images and the arbitrary viewpoint distance MAPs which are combination results of photographing 1 and photographing 2 and the arbitrary viewpoint images and the arbitrary viewpoint distance MAPs of photographing 3.

FIG. 14A is a diagram illustrating the arbitrary viewpoint image of photographing 1. FIG. 14B is a diagram illustrating the arbitrary viewpoint of photographing 2. FIG. 14C is a diagram illustrating the arbitrary viewpoint distance MAP of photographing 1. FIG. 14D is a diagram illustrating the arbitrary viewpoint distance MAP of photographing 2. FIG. 14E is a diagram illustrating the combined arbitrary viewpoint image. FIG. 14F is a diagram illustrating the combination αMAP. FIG. 14G is a diagram illustrating the combined arbitrary viewpoint distance MAP. As illustrated in FIGS. 14A and 14B, the arbitrary viewpoint images of photographing 1 and photographing 2 are combined. Accordingly, the size of the occlusion region indicated by the black region can be reduced. The combination is performed based on the combination αMAP generated from the arbitrary viewpoint distance MAPS of photographing 1 and photographing 2. A region indicated in white in the combination αMAP is a region in which an αMAP value is 1 and indicates a region in which the arbitrary viewpoint image of photographing 2 is combined with the arbitrary viewpoint image of photographing 1. In the region in which the αMAP value is 1, an occlusion region in the arbitrary viewpoint distance MAP of photographing 1 is a region which is not an occlusion region in the arbitrary viewpoint distance MAP of photographing 2. In a region 1401 indicated by a dotted line inside the arbitrary viewpoint distance MAP, the value of the arbitrary viewpoint distance MAP of photographing 2 is smaller than in photographing 1. That is, when viewed from the arbitrary viewpoint position, the αMAP value is set to 1 even in a region indicating that the side of photographing 2 is located at a closer distance, that is, a shorter distance, than in photographing 1.

Figure 15D:
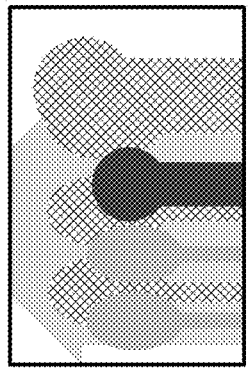
FIGS. 15A to 15G are diagrams for describing a combination process for a combination result of photographing 1 and photographing 2, and photographing 3.
Figure 15C:
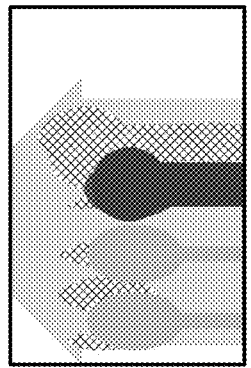
Figure 15B:
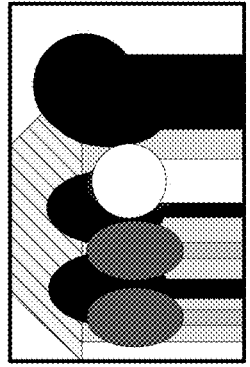
Figure 15A:
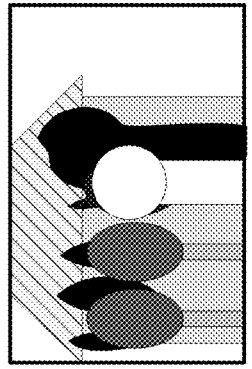
Figure 15G:
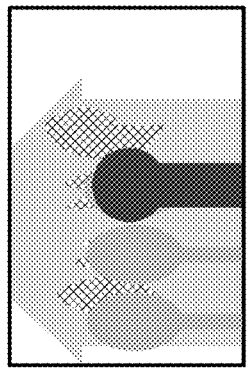
Figure 15F:
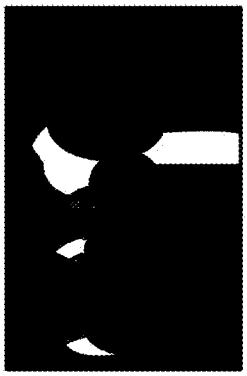
Figure 15E:
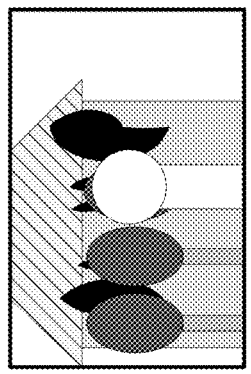

FIG. 15A is a diagram illustrating the arbitrary viewpoint image combined in photographing 1 and photographing 2. FIG. 15B is a diagram illustrating the arbitrary viewpoint image of photographing 3. FIG. 15C is a diagram illustrating the arbitrary viewpoint distance MAP combined in photographing 1 and photographing 2. FIG. 15D is a diagram illustrating the arbitrary viewpoint distance MAP of photographing 3. FIG. 15E is a diagram illustrating the combined arbitrary viewpoint image. FIG. 15F is a diagram illustrating the combination αMAP. FIG. 15G is a diagram illustrating the combined arbitrary viewpoint distance MAP. As illustrated in FIGS. 15A to 15G, the combination process of the results of combining photographing 1 and photographing 2 with photographing 3 is performed in the same way. Accordingly, it is possible to generate the arbitrary viewpoint images and the arbitrary viewpoint distance MAPs in which the size of the occlusion region is reduced more than in FIGS. 14A to 14G.

Figure 3:
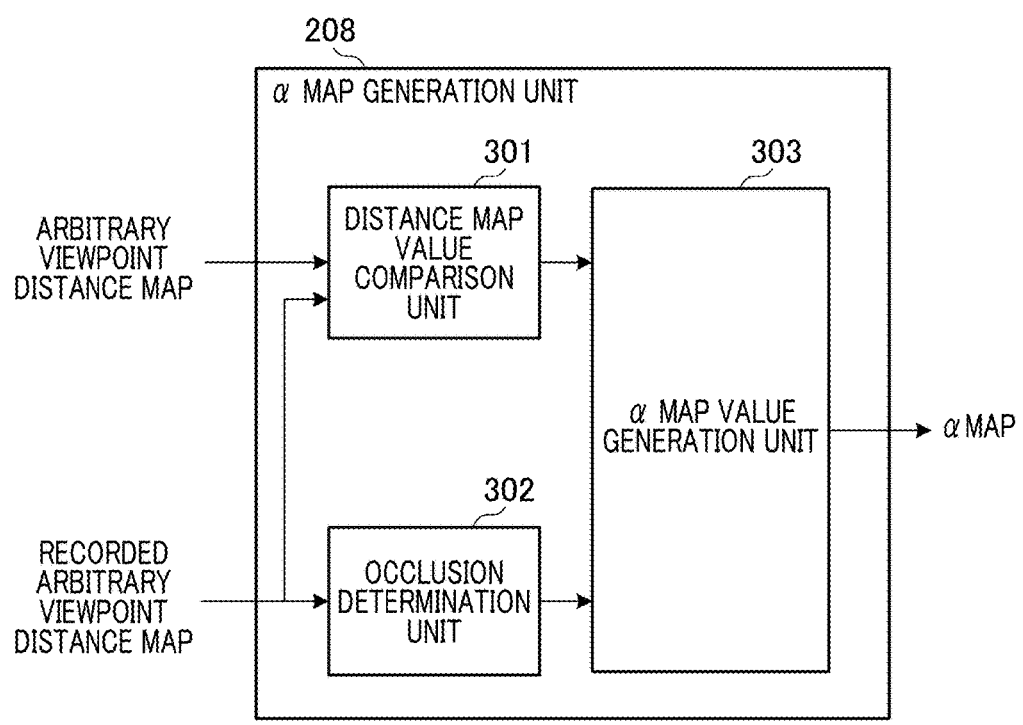
FIG. 3 is a block diagram illustrating an example of the configuration of an αMAP generation unit 208 in FIG. 2.

A process of generating the combination αMAP will be described with reference to FIG. 3. FIG. 3 is a block diagram illustrating an example of the configuration of αMAP generation unit 208. The αMAP generation unit 208 includes a distance MAP value comparison unit 301, an occlusion determination unit 302, an αMAP value generation unit 303.

The distance MAP value comparison unit 301 acquires the information on the k-th arbitrary viewpoint distance MAP and the information on the arbitrary viewpoint distance MAP recorded on the distance MAP recording unit 207, compares both of the pieces of information, and outputs a comparison result to the αMAP value generation unit 303. The occlusion determination unit 302 acquires the information on the arbitrary viewpoint distance MAP recorded on the distance MAP recording unit 207 and outputs an occlusion determination result to the αMAP value generation unit 303. The αMAP value generation unit 303 acquires outputs of the distance MAP value comparison unit 301 and the occlusion determination unit 302 and outputs the combination αMAP.

Figure 5:
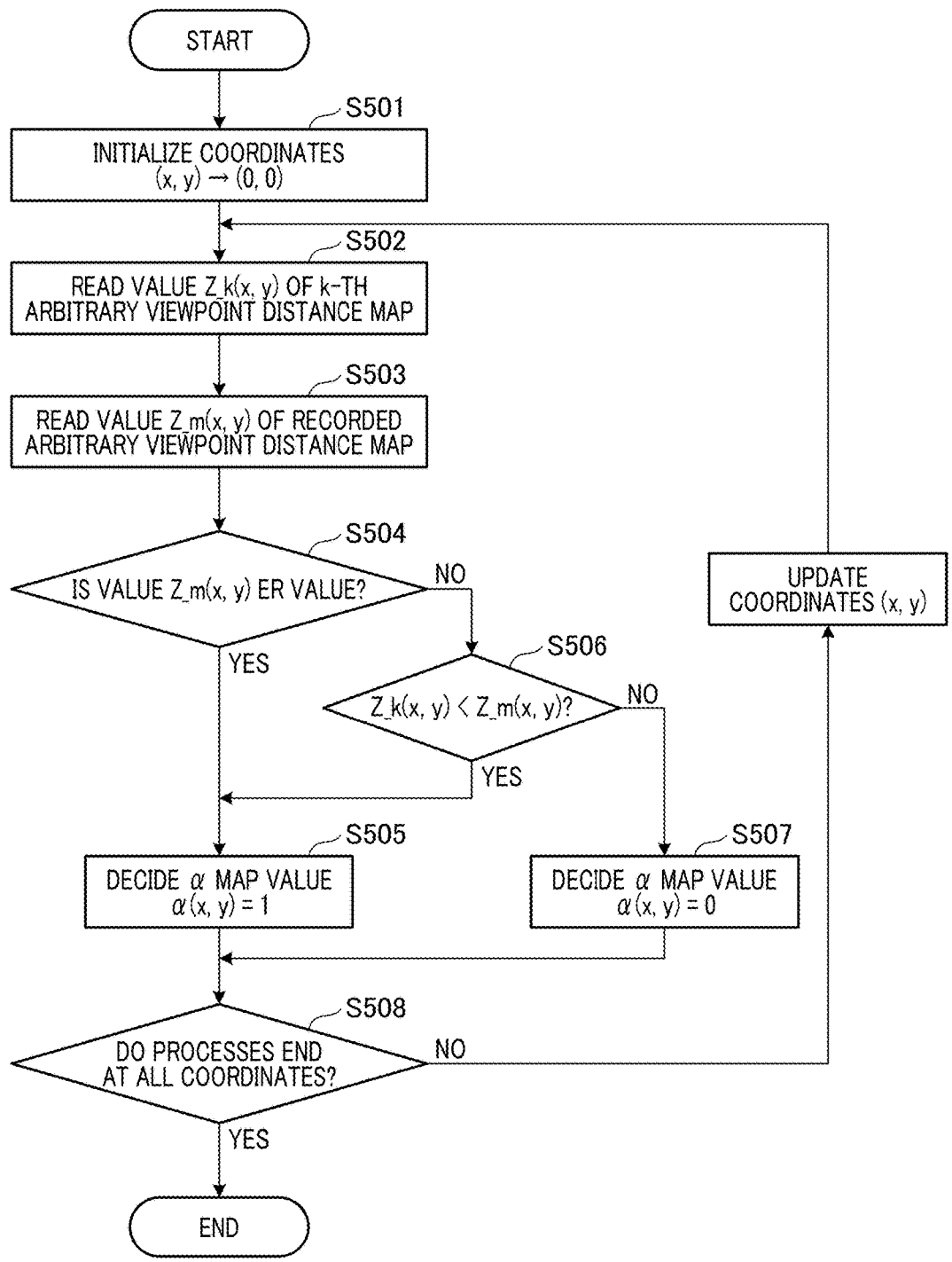
FIG. 5 is a flowchart illustrating a processing example performed by the αMAP generation unit 208 in FIG. 2.

The process of generating the combination αMAP will be described with reference to the flowchart of FIG. 5.

In S501, the αMAP generation unit 208 initializes coordinates (x, y) used at the time of performing of the generation process after S502 in the generation of the αMAP to (0, 0). In S502, a process of reading Z_k(x, y) which is the value of the k-th arbitrary viewpoint distance MAP is performed. The distance MAP value comparison unit 301 acquires Z_k(x, y). In S503, a process of reading Z_m(x, y) which is the value of the arbitrary viewpoint distance MAP recorded on the distance MAP recording unit 207 is performed. Z_m(x, y) is acquired by the distance MAP value comparison unit 301 and the occlusion determination unit 302.

In S504, the occlusion determination unit 302 determines whether the value of Z_m(x, y) is an ER value. The ER value is a value indicating that a region is an occlusion region. When Z_m(x, y) is the ER value, the coordinates (x, y) of the recorded arbitrary viewpoint image are determined to belong to the occlusion region and the process proceeds to S505. When Z_m(x, y) is not the ER value, the coordinates (x, y) of the recorded arbitrary viewpoint image are determined not to belong to the occlusion region and the process proceeds to S506. The ER value in the embodiment is set to a maximum value within a range which can be expressed with a numerical value.

In S505, the αMAP value generation unit 303 decides an αMAP value. In the example, 1 is substituted into α(x, y). The αMAP value generation unit 303 determines that the value of Z_k(x, y) at the coordinates (x, y) is output, and then the process proceeds to S508.

In S506, the distance MAP value comparison unit 301 compares a magnitude of the values of Z_m(x, y) and Z_k(x, y) and determines whether a subject at the coordinates (x, y) of the k-th arbitrary viewpoint image is located in front of the recorded arbitrary viewpoint image. When the value of Z_k(x, y) is less than the value of Z_m(x, y), that is, the subject at the coordinates (x, y) of the k-th arbitrary viewpoint image is determined to be located in front of the recorded arbitrary viewpoint image, the process proceeds to S505. Conversely, when the value of Z_k(x, y) is equal to or greater than the value of Z_m(x, y), the process proceeds to S507.

In S507, the αMAP value generation unit 303 decides the αMAP value. In this example, 0 is substituted into α(x, y). The αMAP value generation unit 303 determines that the value of Z_k(x, y) at the coordinates (x, y) is not output, and then the process proceeds to S508. S508 is a process of determining whether the processes from S502 to S507 are performed at all of the coordinates related to the arbitrary viewpoint image. When the processes are determined to be performed at all of the coordinates, the αMAP generation unit 208 ends the foregoing series of processes. When there are unprocessed coordinates, the process proceeds to S509. In S509, the αMAP generation unit 208 updates the value of the processing target coordinates (x, y), and then the process proceeds to S502 and continues.

In the embodiment, the distance MAP generation unit 203 which is a distance information acquisition unit acquires the image data from the image acquisition unit 201 and generates the distance information in the depth direction. Then, the image transformation unit 204 performs the image transformation process through the coordinate conversion to generate the arbitrary viewpoint image. The distance MAP transformation unit 205 which is a distance information transformation unit acquires the distance information from the distance information acquisition unit and performs the transformation process through the coordinate conversion to generate the arbitrary viewpoint distance MAP. The αMAP generation unit 208 which is a combination information generation unit acquires the transformed distance information and generates the information on the combination αMAP. The information on the combination αMAP is, for example, a binary value of 1 or 0, as illustrated in FIG. 5 (see S505 and S507). The image combination unit 209 combines the plurality of transformed images using the information on the combination αMAP. According to the embodiment, through the sequential processes related to the arbitrary viewpoint images and the arbitrary viewpoint distance MAPs, the occlusion region can be appropriately interpolated, and thus it is possible to generate the arbitrary viewpoint images and the arbitrary viewpoint distance MAPs in which the size of the occlusion region is reduced.

In the embodiment, the example in which the information on the combination αMAP is set to the binary value has been described, but the present invention is not limited to this example. For example, when the combination information generation unit determines that the coordinates (x, y) of the distance information recorded on the distance MAP recording unit 207 which is the distance information recording unit belong to the occlusion region, the value of α(x, y) is set to be relatively large. That is, a ratio at the time of the combination of the pixel values of the transformed images and the distance values indicated by the transformed first distance information at the coordinates is increased. When the coordinates (x, y) do not belong to the occlusion region, the combination information generation unit compares the distance value indicated by the transformed first distance information to the distance value indicated by the second distance information recorded on the distance information recording unit and decides the value α(x, y) from the comparison result. In this case, when the distance value indicated by the first distance information is less than the distance value indicated by the second distance information, the value of α(x, y) is set to be relatively large. When the distance value indicated by the first distance information is equal to or greater than the distance value indicated by the second information, the value of α(x, y) is set to be relatively small. The change in the process of setting the ratio at the time of the combination is the same in an embodiment to be described below.

In the embodiment, the coordinate conversion (geometric deformation) performed to generate the image data after the change in the viewpoint from the image data is also reflected in the distance MAPs corresponding to the image data. However, the invention is not limited thereto, but various kinds of image processing such as distortion correction, a noise reduction process, and other coordinate conversion process performed on the image data may be reflected in the distance MAPs corresponding to the image data, and the distance MAPs may match the image data with high precision. In the embodiment, the various kinds of image processing may be performed instead of or in addition to the coordinate conversion, for example, in S406 of FIG. 4. In particular, a correction process of correcting noise, distortion, defects, or the like caused in an imaging condition, an imaging optical system, an imaging element, or a device such as each processing circuit is preferably performed not only on developed image data but also on the distance MAP.

Geometrical transformation or a correction process for both of the distance MAP and viewing image data is performed not only to generate image data after viewpoint change but also for application of various uses. For example, when the above-described geometrical transformation or the correction process caused from an imaging condition or a device is performed on the viewing image data and the development process is performed for display and recording, it is effective to perform the same geometric deformation or correction process on the distance MAP and record an obtained result as the distance MAP corresponding to the image data.

Second Embodiment

Next, a second embodiment of the present invention will be described. In the embodiment, constituent units related to reliability at the time of the generation of the distance MAP are provided in addition to the configuration described in the first embodiment. When the distance MAP is generated from the photographed image, a reliability MAP is simultaneously generated as reliability information corresponding to the distance MAP. The reliability MAP is subjected to a transformation process and a combination process in relation to an arbitrary viewpoint position, as in the distance MAP or the photographed image. Hereinafter, the reference numerals used above are used for the same constituent elements as those of the first embodiment. The detailed description thereof will be omitted and differences from the first embodiment will be mainly described.

Figure 17A:
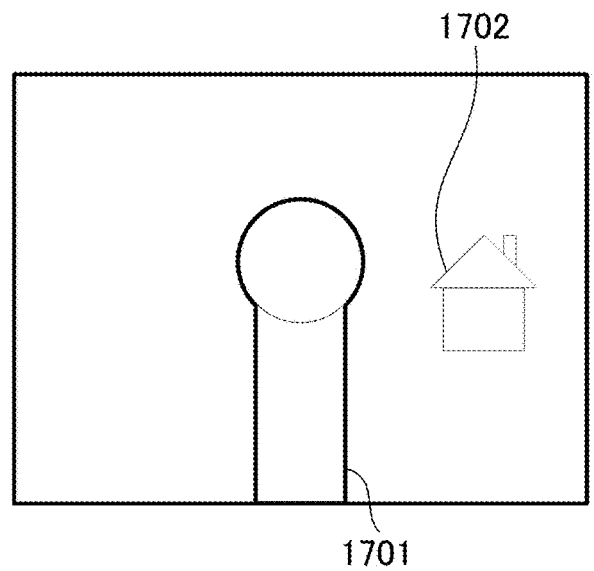
FIGS. 17A to 17C are explanatory diagrams illustrating a reliability MAP according to a second embodiment.
Figure 17B:
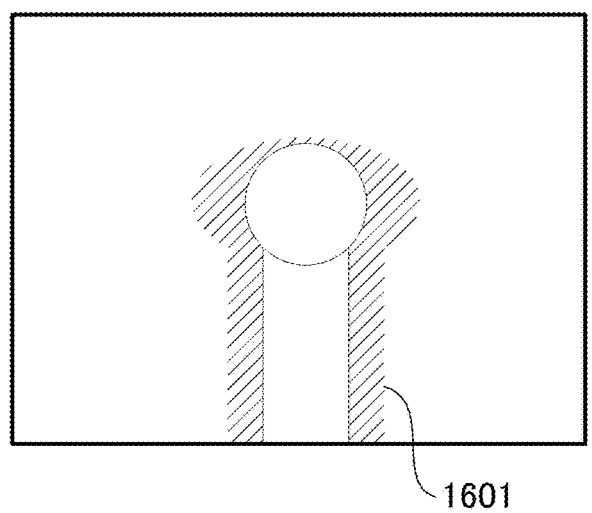
Figure 17C:
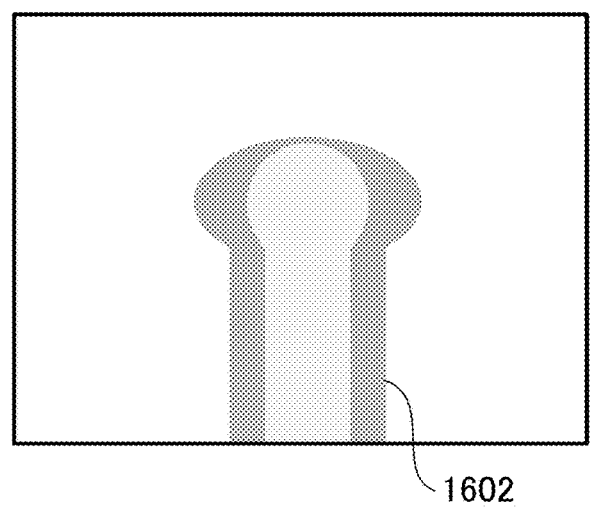

The reliability MAP will be described with reference to FIGS. 17A to 17C. FIG. 17A exemplifies the distance MAP generated from a photographed image. As a method of generating the distance MAP, for example, a known method using correlation calculation by SAD values between a plurality of images split between pupils or images for which viewpoints are different is used. FIG. 17A exemplifies a distance MAP related to a subject region 1701 of which a distance from an image pickup apparatus is close and a subject region 1702 of which a distance from the image pickup apparatus is distant. When the foregoing method is used, a result of the correlation calculation in a boundary region 1601 of an oblique-line portion illustrated in FIG. 17B may not be accurate in some cases. That is, in the boundary region 1601 between the subject region 1701 of which the distance from the image pickup apparatus is close and the subject region 1702 of which the distance from the image pickup apparatus is distant, the result of the correlation calculation may not be accurate in some cases. Accordingly, in the embodiment, a reliability MAP indicating whether a distance MAP value is reliable is used. FIG. 17C exemplifies the reliability MAP. For example, a region 1602 illustrated in FIG. 17C corresponds to the boundary region 1601 of the oblique-line portion illustrated in FIG. 17B. In the region 1602, the value of the reliability MAP is set to be smaller than the periphery of the region 1602. Regions in which the result of the correlation calculation is not accurate include not only the foregoing boundary region but also, for example, a subject region of a repetition pattern in which there is low contrast or several identical textures in an image. The value of the reliability MAP is similarly set to be small in this region. A greater value of the reliability indicates that the value of the corresponding distance map is more reliable. In the method of generating the reliability MAP, there is, for example, a method of performing determination from an SAD value by correlation calculation. For example, in a DFD method, reliability is a value indicating an influence of defocus. A region in which it is difficult to have the influence of defocus is a region lacking clues for calculation of a distance by the DFD method. Therefore, a region with a small value of the reliability is a region in which a calculated distance value is not accurate.

Figure 6:
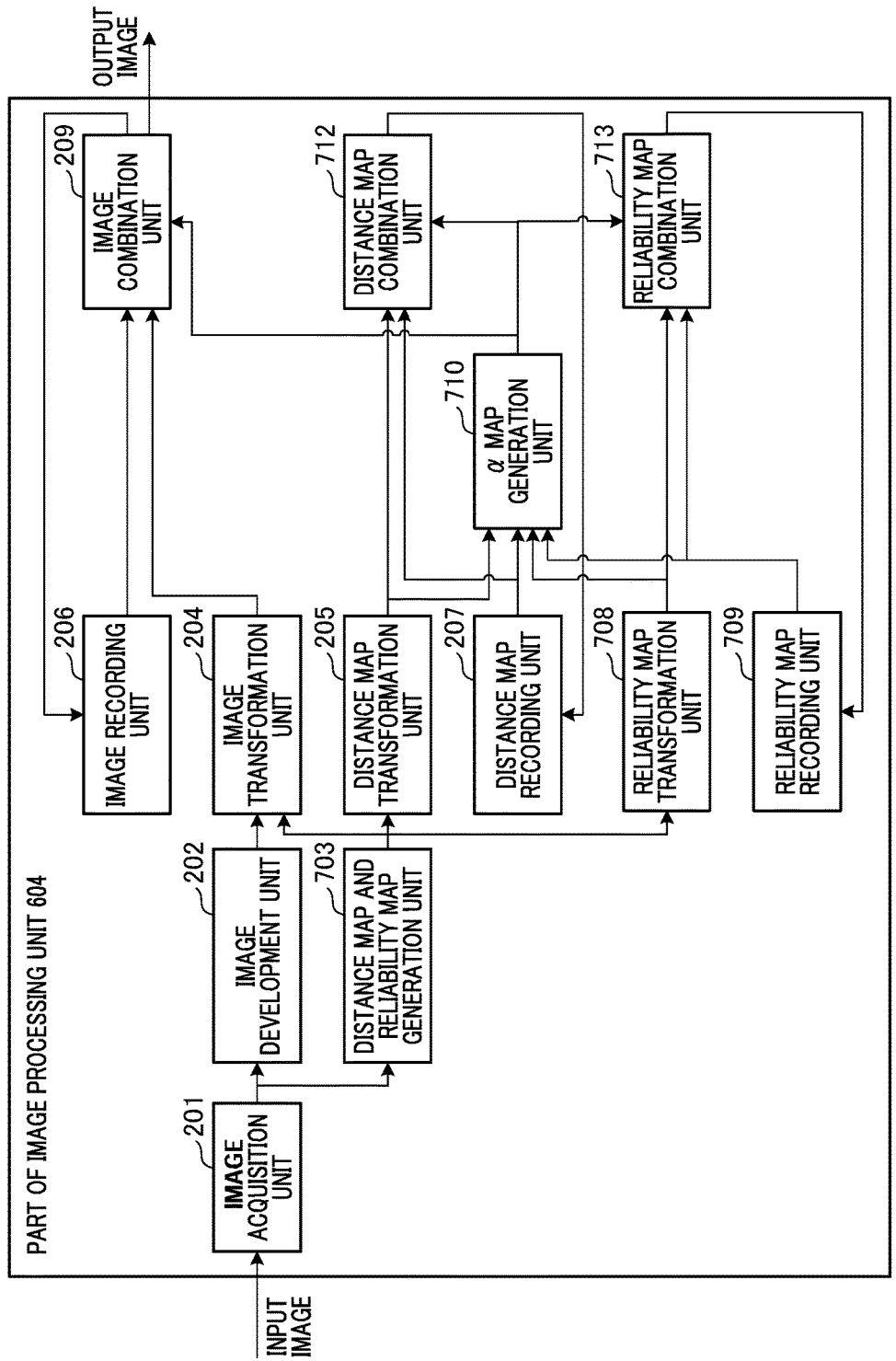
FIG. 6 is a block diagram illustrating an example of the configuration of an image processing unit 604 according to a second embodiment.

A configuration in an image processing unit 604 (see FIG. 1) according to the embodiment will be described in detail with reference to the block diagram of FIG. 6. Differences from the configuration illustrated in FIG. 2 are a distance MAP and reliability MAP generation unit 703, a reliability MAP transformation unit 708, a reliability MAP recording unit 709, an αMAP generation unit 710, a distance MAP combination unit 712, and a reliability MAP combination unit 713. The same reference numerals as the reference numerals given to the units illustrated in FIG. 2 are used for other constituent elements and the detailed description thereof will be omitted.

The distance MAP and reliability MAP generation unit 703 acquires the image data output from the image acquisition unit 201 and generates a distance MAP and a reliability MAP. Data of the distance MAP is output to the image transformation unit 204 and the distance MAP transformation unit 205 and data of the reliability MAP is output to the reliability MAP transformation unit 708. The reliability MAP transformation unit 708 outputs data of the reliability MAP after the transformation process to the reliability MAP combination unit 713. The reliability MAP combination unit 713 acquires outputs of the reliability MAP transformation unit 708, the reliability MAP recording unit 709, and the αMAP generation unit 710 and outputs data of the reliability MAP after the reliability combination process to the reliability MAP recording unit 709.

A process of each unit will be described with reference to the flowchart of FIG. 8.

When photographing starts, the image processing unit 604 substitutes 1 into the variable k used for the sequential processes for initialization in S901. In S902, the image acquisition unit 201 performs a process of acquiring a k-th photographed image. In S903, the distance MAP and reliability MAP generation unit 703 generates data of a k-th distance MAP corresponding to the k-th image acquired in S902 and data of the reliability MAP corresponding to the k-th distance MAP. As a process of generating the distance MAP and the reliability MAP, a known method is used (see Japanese Patent Laid-Open No. 2013-239119).

In S904, the image development unit 202 performs a development process on the data of the k-th image input in S902. In S905, the image transformation unit 204 performs a transformation process on the k-th image developed in S904 using the k-th distance MAP generated in S903 to generate data of a k-th arbitrary viewpoint image. In S906, the distance MAP and reliability MAP generation unit 703 generates a k-th arbitrary viewpoint distance MAP using the k-th distance MAP generated in S903 as an input. The development process, the process of generating the arbitrary viewpoint image data, and the process of generating the arbitrary viewpoint distance MAP are the same as those of the first embodiment.

In S907, the reliability MAP transformation unit 708 generates a reliability MAP at a k-th arbitrary viewpoint position using the k-th reliability MAP generated in S903 as an input. The reliability MAP at the arbitrary viewpoint position is referred to as an "arbitrary viewpoint reliability MAP." Since the method of generating the arbitrary viewpoint reliability MAP is the same as the method of generating the arbitrary viewpoint image in S905, the description thereof will be omitted.

In S908, the distance MAP combination unit 712 reads the data of the arbitrary viewpoint distance MAPs up to the "k−1"-th that were already processed and recorded on the distance MAP recording unit 207. In S909, the reliability MAP combination unit 713 reads the data of the arbitrary viewpoint reliability MAPs up to "k−1"-th that were already processed and recorded on the reliability MAP recording unit 709.

In S910, the αMAP generation unit 710 generates a combination αMAP using the data of the k-th arbitrary viewpoint distance MAP and the recorded arbitrary viewpoint distance MAP, the k-th arbitrary viewpoint reliability MAP, and the recorded arbitrary viewpoint reliability MAP as inputs. The combination αMAP generated by the αMAP generation unit 710 is used in S912, S913, and S914 to be described below. The process of generating the combination αMAP will be described in detail below.

In S911, a process of reading the arbitrary viewpoint images up to the k−1-th that were already processed and recorded is performed. Thereafter, in S912, a process of combining the k-th arbitrary viewpoint image and the recorded arbitrary viewpoint image based on the αMAP generated in S910 is performed. In S913, a process of combining the k-th arbitrary viewpoint distance MAP and the recorded arbitrary viewpoint distance MAP based on the αMAP generated in S910 is performed. The processes from S911 to S913 are the same as those of the first embodiment.

In S914, the reliability MAP combination unit 713 combines the k-th arbitrary viewpoint reliability MAP and the arbitrary viewpoint reliability MAP recorded on the reliability MAP recording unit 709 based on the αMAP generated in S910. The combination method is the same as S912 and S913. In S915, a process of updating the arbitrary viewpoint images combined in S912 as the arbitrary viewpoint images recorded on the image recording unit 206 is performed. In S916, a process of updating the arbitrary viewpoint distance MAPs combined in S913 as the arbitrary viewpoint distance MAPs recorded on the distance MAP recording unit 207 is performed. In S917, the reliability MAP combination unit 713 updates the arbitrary viewpoint reliability MAPs combined in S914 as the arbitrary viewpoint reliability MAPs recorded on the reliability MAP recording unit 709.

S918 is a process of determining whether the photographing performed by the image pickup apparatus ends. The image processing unit 604 determines whether a "k+1"-th image is input. When the photographing performed by the image pickup apparatus ends and the "k+1"-th image is not input, the process proceeds to S919. When the photographing performed by the image pickup apparatus does not end and the "k+1"-th image is input, the process proceeds to S920. In S919, the image processing unit 604 outputs the arbitrary viewpoint image generated from up to k images as an output image and ends the series of processes. The arbitrary viewpoint image data output from the image processing unit 104 is encoded and recorded on the same image file, including the corresponding distance MAP and reliability MAP. The image file conforms to, for example, a file format of EXIF. The distance MAP and the reliability MAP are recorded as metadata. Alternatively, the output arbitrary viewpoint image data is associated with the corresponding distance MAP and is recorded in a separate file in association with the reliability MAP.

In S920, the "k+1"-th image is input, the variable k is updated through an increase of adding 1 to the k value, and the process proceeds to S902.

Figure 7:
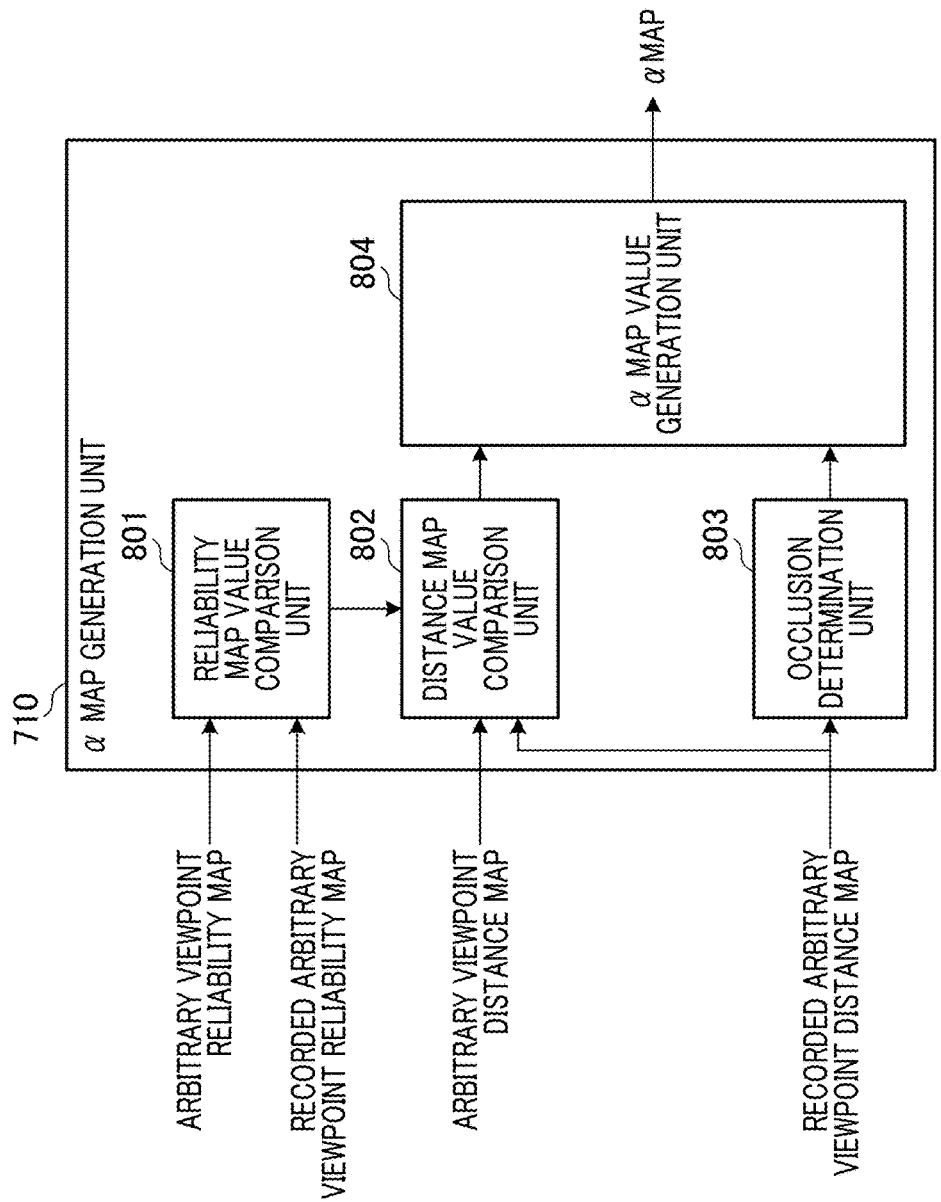
FIG. 7 is a block diagram illustrating an example of the configuration of an αMAP generation unit 710 in FIG. 6.

Next, the process of generating the αMAP in S910 of FIG. 8 will be described in detail. FIG. 7 is a block diagram illustrating an example of the configuration of the αMAP generation unit 710. The αMAP generation unit 710 includes a reliability MAP value comparison unit 801, a distance MAP value comparison unit 802, an occlusion determination unit 803, and an αMAP value generation unit 804. The following data is input and the αMAP generation unit 710 outputs the combination αMAP:

the k-th arbitrary viewpoint distance MAP and the arbitrary viewpoint distance MAP recorded on the distance MAP recording unit 207; and the k-th arbitrary viewpoint reliability MAP and the arbitrary viewpoint reliability MAP recorded on the reliability MAP recording unit 709.

The reliability MAP value comparison unit 801 compares the values of the k-th arbitrary viewpoint reliability MAP and the arbitrary viewpoint reliability MAP recorded on the reliability MAP recording unit 709 and outputs a comparison result to the distance MAP value comparison unit 802.

The process of generating the combination αMAP will be described with reference to the flowchart of FIG. 9.

In S1001, the αMAP generation unit 710 initializes coordinates (x, y) used for the generation process after S1002 in the generation of the αMAP to (0, 0). In S1002, the distance MAP value comparison unit 802 reads Z_k(x, y) which is the value of the k-th arbitrary viewpoint distance MAP. In S1003, the distance MAP value comparison unit 802 and the occlusion determination unit 803 read Z_m(x, y) which is the value of the arbitrary viewpoint distance MAP recorded on the distance MAP recording unit 207. In S1004, the reliability MAP value comparison unit 801 reads R_k(x, y) which is the value of the k-th arbitrary viewpoint reliability MAP. In S1005, the reliability MAP value comparison unit 801 reads R_m(x, y) which is the value of the arbitrary viewpoint reliability MAP recorded on the reliability MAP recording unit 709.

In S1006, the occlusion determination unit 803 determines whether the value of Z_m(x, y) is the ER value. The ER value indicates the above-described occlusion region. When the value of Z_m(x, y) is the ER value, the coordinates (x, y) of the recorded arbitrary viewpoint image are determined to belong to the occlusion region and the process proceeds to S1007. Conversely, when the value of Z_m(x, y) is not the ER value, the coordinates (x, y) of the recorded arbitrary viewpoint image are determined not to belong to the occlusion region and the process proceeds to S1008.

In S1007, the αMAP value generation unit 804 substitutes 1 into a value α(x, y) of the αMAP and determines that the value of Z_k(x, y) at the coordinates (x, y) is output, and then the process proceeds to S1012. In S1008, the distance MAP value comparison unit 802 compares the values of Z_m(x, y) and Z_k(x, y) and determines whether a subject at the coordinates (x, y) of the k-th arbitrary viewpoint image is located in front of the subject in the recorded arbitrary viewpoint image. When the value of Z_k(x, y) is less than the value of Z_m(x, y), that is, the subject at the coordinates (x, y) of the k-th arbitrary viewpoint image is determined to be located in front of the subject in the recorded arbitrary viewpoint image, the process proceeds to S1009. Conversely, when the value of Z_k(x, y) is equal to or greater than the value of Z_m(x, y), the process proceeds to S1010.

In S1009, the reliability MAP value comparison unit 801 calculates a difference value between the value R_k(x, y) of the k-th arbitrary viewpoint reliability MAP and the value R_m(x, y) of the recorded arbitrary viewpoint reliability MAP and compares the difference value to a first threshold value (written as TH1). As the first threshold value TH1, a fixed value decided in advance or a variable value varying according to the value of the reliability MAP is used. When the difference value between R_k(x, y) and R_m(x, y) is greater than the first threshold value TH1, the reliability MAP value comparison unit 801 determines that the reliability of R_k(x, y) is sufficiently higher than that of R_m(x, y), and then the process proceeds to S1007. When the difference value between R_k(x, y) and R_m(x, y) is equal to or less than the first threshold value TH1, the process proceeds to S1011.

In S1010, the reliability MAP value comparison unit 801 compares the difference value between R_k(x, y) and R_m (x, y) to a second threshold value (written as TH2) and determines whether the difference value is greater than the second threshold value TH2. As the second threshold value TH2, a fixed value decided in advance or a variable value varying according to the value of the reliability MAP is used. In the embodiment, the second threshold value TH2 is a different value from the first threshold value TH1, but the same threshold value may be used as necessary. When the difference value between R_k(x, y) and R_m(x, y) is greater than the second threshold value TH2, it is determined that the reliability of R_k(x, y) is sufficiently higher than that of R_m(x, y), and then the process proceeds to S1007. When the difference value between R_k(x, y) and R_m(x, y) is equal to or less than the second threshold value TH2, the process proceeds to S1011. In S1011, the αMAP value generation unit 804 substitutes 0 into the value α(x, y) of the αMAP and determines that the value of Z_k(x, y) at the coordinates (x, y) is not output, and then the process proceeds to S1012.

In S1012, the αMAP generation unit 710 determines whether the processes from S1002 to S1011 are performed at all of the coordinates corresponding to the arbitrary viewpoint image. When the αMAP generation unit 710 determines that the processes are performed at all of the coordinates, the αMAP generation unit 710 ends the process. When the processes have not ended, the process proceeds to S1013. In S1013, the αMAP generation unit 710 updates the processing target coordinates (x, y) and then the process proceeds to S1002 and continues.

In the embodiment, the reliability information generation unit for generating the reliability information indicating the reliability of the distance information calculated from the image data is provided. The present invention is not limited to the embodiment in which the reliability information is generated at the time of the generation of the distance information, but the reliability information generation unit different from the distance information generation unit generates the reliability information in an embodiment. The reliability MAP combination unit 713 which is a reliability information combination unit acquires the reliability information transformed by the reliability MAP transformation unit 708 which is a reliability information transformation unit and the reliability information recorded on the reliability MAP recording unit 709 which is a reliability information recording unit. The reliability MAP combination unit 713 combines the reliability information using the information on the combination αMAP. According to the embodiment, the image processing device capable of performing the sequential processes of generating the arbitrary viewpoint image by appropriately interpolating the occlusion region can be provided. By using the reliability MAP as reliability information corresponding to the distance MAP, it is possible to reflect the accurate distance information in the process of generating the arbitrary viewpoint image.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-078987, filed Apr. 8, 2015, and Japanese Patent Application No. 2016-030973, filed Feb. 22, 2016, which is hereby incorporated by reference wherein in its entirety.

What is claimed is:

1. An image processing device comprising:
a memory that stores instructions; and
one or more processors that execute the instructions to cause the image processing device to function as:
an image acquisition unit configured to acquire an image;
a depth information acquisition unit configured to acquire depth information relating to a depth distribution of the image acquired by the image acquisition unit;
an image transformation unit configured to perform an image transformation process on the image acquired by the image acquisition unit through coordinate conversion;
a depth information transformation unit configured to perform a transformation process on the depth information acquired by the depth information acquisition unit through coordinate conversion corresponding to the coordinate conversion performed on the image;
a combination information generation unit configured to generate combination information based on the depth information transformed by the depth information transformation unit; and
an image combination unit configured to combine a plurality of images transformed by the image transformation unit based on the combination information generated by the combination information generation unit.

2. The image processing device according to claim 1,
wherein the one or more processors execute the instructions to further function as:
a depth information combination unit configured to acquire and combine a plurality of pieces of depth information transformed by the depth information transformation unit in correspondence with a plurality of images acquired by the image acquisition unit; and
a depth information recording unit configured to record the depth information output by the depth information combination unit, and wherein the combination information generation unit acquires the depth information transformed by the depth information transformation unit and the depth information recorded on the depth information recording unit and generates the combination information.

3. The image processing device according to claim 2, wherein the combination information generation unit decides the combination information indicating a combination ratio by comparing first depth information transformed by the depth information transformation unit to second depth information recorded on the depth information recording unit.

4. The image processing device according to claim 3, wherein the combination information generation unit determines an occlusion region which is a region at a viewpoint at which information is not obtained from an image and sets a ratio at a time of combination of a pixel value of the transformed image and a depth value indicated by the first depth information at coordinates of the second depth information to be relatively large when the coordinates belong to the occlusion region.

5. The image processing device according to claim 4, wherein the combination information generation unit sets the ratio at the time of the combination of the pixel value of the transformed image and the depth value indicated by the first depth information at the coordinates to be relatively large when the coordinates of the second depth information do not belong to the occlusion region and the depth value indicated by the first depth information is less than a depth value indicated by the second depth information, and
wherein the combination information generation unit sets the ratio at the time of the combination of the pixel value of the transformed image and the depth value indicated by the first depth information at the coordinates to be relatively small when the depth value indicated by the first depth information is equal to or greater than the depth value indicated by the second depth information.

6. The image processing device according to claim 1,
wherein the one or more processors execute the instructions to further function as a depth information recording unit configured to record the depth information, and
wherein the combination information generation unit selects the depth information indicating that a subject is present at a closer depth from the depth information transformed by the depth information transformation unit and the depth information recorded on the depth information recording unit and generates the combination information.

7. The image processing device according to claim 6,
wherein the one or more processors execute the instructions to further function as a depth information combination unit configured to acquire and combine a plurality of pieces of depth information transformed by the depth information transformation unit in correspondence with a plurality of images acquired by the image acquisition unit, and
wherein the depth information combination unit combines the depth information transformed by the depth information transformation unit and the depth information recorded on the depth information recording unit using the combination information generated by the combination information generation unit.

8. The image processing device according to claim 1, wherein the image transformation unit performs a transformation process on the image through the coordinate conversion of generating an image of a different viewpoint from the image acquired by the image acquisition unit.

9. The image processing device according to claim 1, wherein the depth information transformation unit performs depth information conversion accompanying a change in a viewpoint of the depth information acquired by the depth information acquisition unit.

10. The image processing device according to claim 1, wherein the depth information acquisition unit acquires the depth information generated from one of (i) a plurality of images split between pupils, and (ii) a plurality of images of different viewpoints.

11. The image processing device according to claim 1, wherein the one or more processors execute the instructions to further function as a reliability information generation unit configured to generate reliability information indicating a reliability of the depth information acquired by the depth information acquisition unit, and
wherein the combination information generation unit generates the combination information using the depth information and the reliability information.

12. The image processing device according to claim 11, wherein the one or more processors execute the instructions to further function as:
a reliability information transformation unit configured to acquire the reliability information generated by the reliability information generation unit and perform a transformation process through the coordinate conversion; and
a reliability information combination unit configured to acquire a plurality of pieces of reliability information transformed by the reliability information transformation unit and sequentially combine the reliability information.

13. The image processing device according to claim 12, wherein the one or more processors execute the instructions to further function as a reliability information recording unit configured to record the reliability information output by the reliability information combination unit, and
wherein the reliability information combination unit combines the reliability information transformed by the reliability information transformation unit and the reliability information recorded on the reliability information recording unit using the combination information generated by the combination information generation unit.

14. The image processing device according to claim 11, wherein the combination information generation unit acquires a plurality of pieces of depth information transformed by the depth information transformation unit and a plurality of pieces of reliability information generated by the reliability information generation unit and generates the combination information indicating a combination ratio.

15. The image processing device according to claim 1, wherein the image acquisition unit includes an imaging unit.

16. An image processing method performed by an image processing device during processing of an image, the method comprising:
acquiring, by an image acquisition unit, the image;
acquiring, by a depth information acquisition unit, depth information relating to a depth distribution of the image acquired by the image acquisition unit;
performing, by an image transformation unit, an image transformation process on the image acquired by the image acquisition unit through coordinate conversion;
performing, by a depth information transformation unit, a transformation process on the depth information acquired by the depth information acquisition unit through coordinate conversion corresponding to the coordinate conversion performed on the image;
generating, by a combination information generation unit, combination information based on the depth information transformed by the depth information transformation unit; and
combining, by an image combination unit, a plurality of images transformed by the image transformation unit based on the combination information generated by the combination information generation unit.

17. A non-transitory storage medium storing a control program of an image processing device causing a computer to perform steps of an image processing method performed by the image processing device during processing of an image, the method comprising:
acquiring, by an image acquisition unit, the image;
acquiring, by a depth information acquisition unit, depth information relating to a depth distribution of the image acquired by the image acquisition unit;
performing, by an image transformation unit, an image transformation process on the image acquired by the image acquisition unit through coordinate conversion;
performing, by a depth information transformation unit, a transformation process on the depth information acquired by the depth information acquisition unit through coordinate conversion corresponding to the coordinate conversion performed on the image;
generating, by a combination information generation unit, combination information based on the depth information transformed by the depth information transformation unit; and
combining, by an image combination unit, a plurality of images transformed by the image transformation unit based on the combination information generated combination information generation unit.

18. An image processing method performed by an image processing device during processing of an image, the method comprising:
acquiring, by an image acquisition unit, the image;
acquiring, by a depth information acquisition unit, depth information relating to a depth distribution of the image acquired by the image acquisition unit;
performing, by an image transformation unit, an image transformation process on the image acquired by the image acquisition unit through coordinate conversion;
performing, by a depth information transformation unit, a transformation process on the depth information acquired by the depth information acquisition unit through coordinate conversion corresponding to the coordinate conversion performed on the image;
acquiring and combining, by a depth information combination unit, a plurality of pieces of depth information transformed by the depth information transformation unit in correspondence with a plurality of images acquired by the image acquisition unit; and
combining, by an image combination unit, a plurality of images transformed by the image transformation unit based on the depth information combined by the depth information combination unit.

19. A non-transitory storage medium storing a control program of an image processing device causing a computer to perform steps of an image processing method performed by the image processing device during processing of an image, the method comprising:

acquiring, by an image acquisition unit, the image;

acquiring, by a depth information acquisition unit, depth information relating to a depth distribution of the image acquired by the image acquisition unit;

performing, by an image transformation unit, an image transformation process on the image acquired by the image acquisition unit through coordinate conversion;

performing, by a depth information transformation unit, a transformation process on the depth information acquired by the depth information acquisition unit through coordinate conversion corresponding to the coordinate conversion performed on the image;

acquiring and combining, by a depth information combination unit, a plurality of pieces of depth information transformed by the depth information transformation unit in correspondence with a plurality of images acquired by the image acquisition unit; and combining, by an image combination unit, a plurality of images transformed by the image transformation unit based on the depth information combined by the depth information combination unit.

20. An image processing device comprising:

a memory that stores instructions; and one or more processors that execute the instructions to cause the image processing device to function as:

an image acquisition unit configured to acquire an image;

a depth information acquisition unit configured to acquire depth information relating to a depth distribution of the image acquired by the image acquisition unit;

an image transformation unit configured to perform an image transformation process on the image acquired by the image acquisition unit through coordinate conversion;

a depth information transformation unit configured to perform a transformation process on the depth information acquired by the depth information acquisition unit through coordinate conversion corresponding to the coordinate conversion performed on the image;

a depth information combination unit configured to acquire and combine a plurality of pieces of depth information transformed by the depth information transformation unit in correspondence with a plurality of images acquired by the image acquisition unit; and an image combination unit configured to combine a plurality of images transformed by the image transformation unit based on the depth information combined by the depth information combination unit.

21. The image processing device according to claim 20, wherein the image acquisition unit sequentially acquires the plurality of images, and wherein the depth information combination unit sequentially combines the plurality of pieces of depth information transformed by the depth information transformation unit in correspondence with the plurality of images acquired by the image acquisition unit.

\* \* \* \* \*